(12) United States Patent
Yarabolu et al.

(10) Patent No.: US 12,284,203 B2
(45) Date of Patent: Apr. 22, 2025

(54) GENERATING PASSWORD COMPLEXITY RULES BASED ON ATTACK PATTERN ANALYSIS USING HASH SEGMENTATION

(71) Applicant: Bank of America Corporation, Charlotte, NC (US)

(72) Inventors: Vijay Kumar Yarabolu, Telangana (IN); Gowthaman Sundararaj, Tamilnadu (IN)

(73) Assignee: Bank of America Corporation, Charlotte, NC (US)

( * ) Notice: Subject to any disclaimer, the term of this patent is extended or adjusted under 35 U.S.C. 154(b) by 303 days.

(21) Appl. No.: 18/098,325

(22) Filed: Jan. 18, 2023

(65) Prior Publication Data

US 2024/0244075 A1 Jul. 18, 2024

(51) Int. Cl.
*H04L 9/40* (2022.01)
(52) U.S. Cl.
CPC ........ *H04L 63/1433* (2013.01); *H04L 63/083* (2013.01); *H04L 63/1425* (2013.01); *H04L 63/20* (2013.01)
(58) Field of Classification Search
CPC ............... H04L 63/1433; H04L 63/083; H04L 63/1425; H04L 63/20; H04L 63/1416
USPC .......................................................... 726/1
See application file for complete search history.

(56) References Cited

U.S. PATENT DOCUMENTS

| | | | |
|---|---|---|---|
| 9,887,983 B2 | 2/2018 | Lindemann et al. | |
| 9,935,940 B1 * | 4/2018 | DeMoss | H04L 63/083 |
| 10,129,499 B1 * | 11/2018 | Boone | H04W 12/047 |
| 10,956,560 B1 * | 3/2021 | Sanchez | H04L 9/3226 |
| 11,438,378 B1 * | 9/2022 | Dell'Amico | H04L 9/3236 |
| 11,477,245 B2 | 10/2022 | Crabtree et al. | |
| 11,507,667 B2 | 11/2022 | Sayapin et al. | |
| 11,509,486 B2 | 11/2022 | Fallah et al. | |
| 11,509,846 B2 | 11/2022 | Fukuoka et al. | |
| 11,531,577 B1 | 12/2022 | Bernat et al. | |

(Continued)

OTHER PUBLICATIONS

Liu et al.; GENPass: A General Deep Learning Model for Password Guessing with PCFG Rules and Adversarial Generation; IEEE (Year: 2018).*

(Continued)

*Primary Examiner* — Kambiz Zand
*Assistant Examiner* — Mahabub S Ahmed
(74) *Attorney, Agent, or Firm* — Banner & Witcoff, Ltd.

(57) ABSTRACT

Aspects of the disclosure relate to a network traffic monitoring platform. The platform may train an attack pattern analysis model to output a behavior profile and a cumulative attack score. The platform may identify a password failure rate spike. The platform may extract a password hash from the network traffic. The platform may generate the behavior profile based on the password hash. The platform may generate the cumulative attack score based on the behavior profile. The platform may compare the cumulative attack score to a threshold. Based on identifying that the cumulative attack score is below the threshold, the platform may identify the password hash as a secure hash. Based on identifying that the cumulative attack score meets or exceeds the threshold, the platform may and generate password complexity rules. The platform may refine the attack pattern analysis model based on the attacked hash and the cumulative attack score.

20 Claims, 13 Drawing Sheets

(56) References Cited

U.S. PATENT DOCUMENTS

| | | |
|---|---|---|
| 11,533,307 B2 | 12/2022 | Mahajan et al. |
| 11,537,533 B2 | 12/2022 | Litichever et al. |
| 11,556,630 B2 | 1/2023 | Malka et al. |
| 11,556,898 B1 | 1/2023 | Stewart |
| 11,556,994 B1 | 1/2023 | Skaggs et al. |
| 11,558,188 B2 | 1/2023 | Khandani |
| 11,558,196 B2 | 1/2023 | Hassanzadeh et al. |
| 11,558,365 B1 | 1/2023 | McCorkendale |
| 11,558,747 B2 | 1/2023 | Shaw et al. |
| 2007/0180260 A1* | 8/2007 | Crescenzo ............. G06F 21/31 713/183 |
| 2011/0214187 A1* | 9/2011 | Wittenstein ........... H04L 61/301 726/25 |
| 2017/0091450 A1 | 3/2017 | Turgeman |
| 2017/0366353 A1 | 12/2017 | Struttmann |
| 2018/0039990 A1* | 2/2018 | Lindemann ............ G06V 40/19 |
| 2018/0322275 A1* | 11/2018 | Li ......................... G06F 21/554 |
| 2018/0332079 A1* | 11/2018 | Ashley ................... H04L 63/20 |
| 2019/0159030 A1 | 5/2019 | Lim et al. |
| 2019/0164165 A1* | 5/2019 | Ithabathula ............ G06F 21/34 |
| 2020/0351299 A1* | 11/2020 | Burch ................ H04L 63/1416 |
| 2020/0389469 A1* | 12/2020 | Litichever ............... H04W 4/40 |
| 2021/0218710 A1 | 7/2021 | Fallah et al. |
| 2022/0050921 A1 | 2/2022 | LaFever et al. |
| 2022/0182397 A1* | 6/2022 | Romero Zambrano .................... H04L 63/1416 |
| 2022/0329622 A1* | 10/2022 | Senecal ................. G06F 16/958 |
| 2022/0393941 A1 | 12/2022 | Singh |
| 2022/0405750 A1 | 12/2022 | Fallah et al. |
| 2022/0407861 A1 | 12/2022 | Beecham et al. |
| 2023/0023584 A1* | 1/2023 | Sternfeld ............ G06F 21/6218 |
| 2023/0082633 A1* | 3/2023 | Seletskiy ............ H04L 63/1425 726/7 |
| 2023/0086281 A1* | 3/2023 | Kaidi ..................... H04L 63/20 726/22 |
| 2023/0328085 A1* | 10/2023 | Rueffer ............... H04L 63/1416 726/23 |

OTHER PUBLICATIONS

Blocki et al.; On the Economics of Offline Password Cracking; IEEE (Year: 2018).*

* cited by examiner

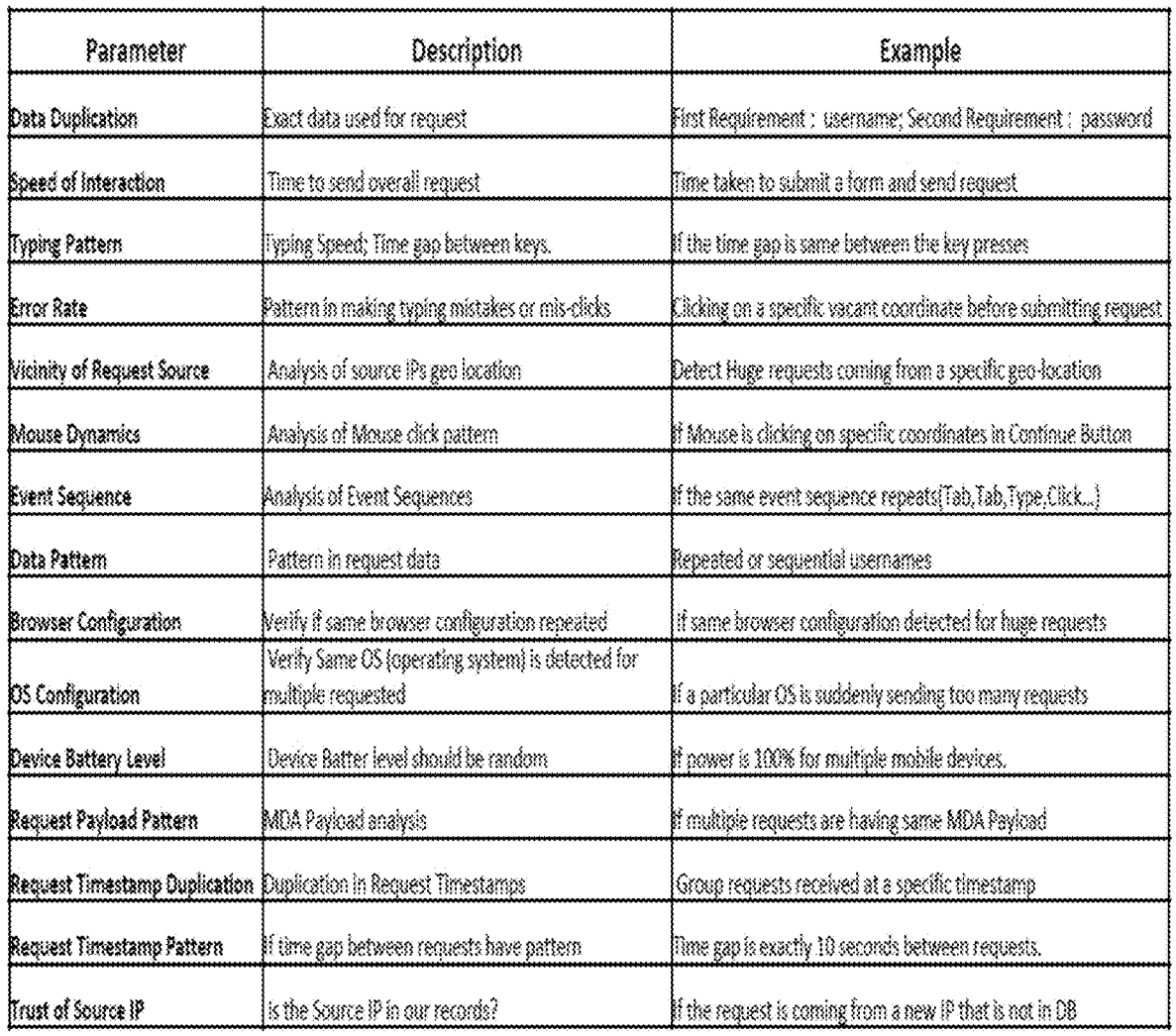

| Parameter | Description | Example |
|---|---|---|
| Data Duplication | Exact data used for request | First Requirement : username; Second Requirement : password |
| Speed of Interaction | Time to send overall request | Time taken to submit a form and send request |
| Typing Pattern | Typing Speed; Time gap between keys. | If the time gap is same between the key presses |
| Error Rate | Pattern in making typing mistakes or mis-clicks | Clicking on a specific vacant coordinate before submitting request |
| Vicinity of Request Source | Analysis of source IPs geo location | Detect Huge requests coming from a specific geo-location |
| Mouse Dynamics | Analysis of Mouse click pattern | If Mouse is clicking on specific coordinates in Continue Button |
| Event Sequence | Analysis of Event Sequences | If the same event sequence repeats(Tab,Tab,Type,Click...) |
| Data Pattern | Pattern in request data | Repeated or sequential usernames |
| Browser Configuration | Verify if same browser configuration repeated | If same browser configuration detected for huge requests |
| OS Configuration | Verify Same OS (operating system) is detected for multiple requested | If a particular OS is suddenly sending too many requests |
| Device Battery Level | Device Batter level should be random | If power is 100% for multiple mobile devices. |
| Request Payload Pattern | MDA Payload analysis | If multiple requests are having same MDA Payload |
| Request Timestamp Duplication | Duplication in Request Timestamps | Group requests received at a specific timestamp |
| Request Timestamp Pattern | If time gap between requests have pattern | Time gap is exactly 10 seconds between requests. |
| Trust of Source IP | Is the Source IP in our records? | If the request is coming from a new IP that is not in DB |

Password Hash Designation Interface
Welcome, <Enterprise Device Profile>
Alert: Password Failure Rate Spike
Subject: Attacked Password
Cumulative Attack Score: 76%
Result: Password Hash Designated "Attacked"

Override Designation?

[ Yes ]   [ No ]

FIG. 5B

GENERATING PASSWORD COMPLEXITY RULES BASED ON ATTACK PATTERN ANALYSIS USING HASH SEGMENTATION

BACKGROUND

Aspects of the disclosure relate to generating password complexity rules. In some instances, a system may implement a password enforcement policy containing password complexity rules regulating the creation of new passwords. In some examples, the password enforcement policy may vary in which rules the policy applies from application to application, but the complexity rules themselves remain static. In some instances, attackers seeking unauthorized access to the system may use various techniques (e.g., password spray attacks, rainbow attacks, and/or other techniques) to eventually crack these static passwords. Accordingly, it may be important to improve the security and efficiency of password complexity rules.

SUMMARY

Aspects of the disclosure provide effective, efficient, scalable, and convenient technical solutions that address and overcome the technical problems associated with generating password complexity rules. In accordance with one or more arrangements of the disclosure, a computing platform with at least one processor, a communication interface, and memory storing computer-readable instructions may train an attack pattern analysis model based on historical password hashes. Training the attack pattern analysis model may configure the attack pattern analysis model to output a behavior profile corresponding to a plurality of parameters and a cumulative attack score for a password hash. The computing platform may monitor network traffic of a network. Monitoring the network traffic may comprise monitoring a password failure rate. The computing platform may identify a password failure rate spike based on the monitoring of the password failure rate. The computing platform may extract a first password hash associated with the password failure rate spike from the network traffic of the network. The computing platform may generate, based on inputting the first password hash into the attack pattern analysis model, a first behavior profile corresponding to a first plurality of parameters for the first password hash. The computing platform may generate a first cumulative attack score corresponding to the first password hash based on the first behavior profile corresponding to the first plurality of parameters and using the attack pattern analysis model. The computing platform may compare the first cumulative attack score to a threshold value. Based on identifying that the first cumulative attack score is below the threshold value, the computing platform may identify the first password hash as a secure hash, and send a notification to an enterprise user device. Based on identifying that the first cumulative attack score meets or exceeds the threshold value, the computing platform may identify the first password hash as an attacked hash, generate password complexity rules based on the attacked hash, and cause storage of the password complexity rules at an attack pattern storage system, based on generating the password complexity rules. Generating the password complexity rules may update a password enforcement policy preventing use of the attacked hash as a future password. The computing platform may refine the attack pattern analysis model based on the attacked hash.

In one or more instances, generating the password complexity rules may comprise retrieving a plurality of additional attacked hashes from the attack pattern storage system. Generating the password complexity rules may also comprise identifying one or more requirements corresponding to password creation, based on the attacked hash and the plurality of additional attacked hashes. Generating the password complexity rules may further comprise updating a password enforcement policy based on the one or more requirements corresponding to password creation. Updating the password enforcement policy may further be based on the one or more requirements corresponding to password creation. In one or more examples, the one or more requirements corresponding to password creation may comprise one or more of: restrictions on included terms, restrictions on certain alphanumeric sequences, numeral inclusion requirements, special character inclusion requirements, letter case requirements, recency restrictions, or length requirements.

In one or more examples, the computing platform may perform behavioral analysis on the attack pattern storage system based on the attacked hash and the plurality of additional attacked hashes. In one or more instances, the computing platform may receive the historical password hashes from the attack pattern storage system. The computing platform may send one or more commands directing the attack pattern storage system to store the attacked hash, based on identifying the attacked hash. In one or more instances, performing behavioral analysis on the attack pattern storage system may comprise building a network graph comprising a plurality of nodes and a plurality of edges, using the attacked hash and the plurality of additional attacked hashes. Each of the plurality of nodes may correspond to a parameter and each of the plurality of edges may correspond to a hash. Performing behavioral analysis may also comprise shading the network graph based on a concentration of the plurality of edges and the plurality of nodes, and updating the cumulative attack score based on the coloring and the attacked hash.

In one or more examples, the computing platform may receive a proposed password from a user device. The computing platform may compare the proposed password to the updated password enforcement policy. The computing platform may identify, based on the comparing, whether the proposed password passes or fails a compliance check based on the updated password enforcement policy. Based on identifying that the proposed password passes the compliance check, the computing platform may update a user profile corresponding to the user device. Based on identifying that the proposed password fails the compliance check, the computing platform may reject the proposed password and send the updated password enforcement policy to the user device. In one or more instances, the user profile corresponding to the user device may comprise a user identifier and a password repository comprising one or more historical passwords.

In one or more examples, the computing platform may send one or more display commands directing the enterprise user device to display a user interface and requesting user input corresponding to a password hash designation to the enterprise user device. The computing platform may receive the user input corresponding to the password hash designation from the enterprise user device, based on requesting the user input corresponding to the password hash designation. Based on user input directing the computing platform to override the password hash designation, the computing platform may override the password hash designation. Based on user input directing the computing platform to confirm the password hash designation, the computing platform may confirm the password hash designation. In one or more instances, the password hash designation may comprise a secure hash designation or an attacked hash designation.

In one or more examples, extracting the password hash may comprise identifying a frequency score corresponding to the first password hash associated with the password failure rate spike, based on the network traffic. The frequency score may indicate a number of authentication attempts corresponding to the password hash. Extracting the password hash may comprise comparing the frequency score to a failure rate threshold. Based on identifying that the frequency score meets or exceeds the failure rate threshold, extracting the first password hash may comprise storing the first password hash to the computing platform. In one or more instances, the frequency score may comprise one or more of: an integer value, a binary value, a decimal value, a fractional value, or a percentile value.

In one or more examples, the first behavior profile may comprise a list of the first plurality of parameters and values corresponding to the first plurality of parameters. The values corresponding to the first plurality of parameters may comprise one or more of: numerical values, percentile values, or binary values. In one or more instances, the first plurality of parameters may comprise one or more of: data duplication, speed of interaction, typing pattern, error rate, vicinity of request source, mouse dynamics, event sequence analysis, request data patterns, browser configuration, operating system configuration, device battery level, request payload pattern, request timestamp duplication, request timestamp pattern, or trust of a source internet protocol.

In one or more examples, the password failure rate may comprise an indicator of a number of failed authentication attempts corresponding to the first password hash and requested by a user. In one or more instances, the computing platform may identify a device signature associated with the password failure rate spike based on the network traffic. The computing platform may configure a device attack list based on the device signature. The device attack list may cause the computing platform to reject password change requests corresponding to user devices included in the device attack list, based on the device attack list. In one or more instances, the threshold value may be a configurable value configured by an enterprise user. In one or more examples, the first cumulative attack score may comprise one or more of: an integer value, a percentage value, a decimal value, a hexadecimal value, or a binary value.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 depicts an illustrative table of parameters used to generate password complexity rules based on attack pattern analysis using hash segmentation in accordance with one or more example arrangements;

FIGS. 5A-5C depict illustrative graphical user interfaces depicting generating password complexity rules based on attack pattern analysis using hash segmentation in accordance with one or more example arrangements.

DETAILED DESCRIPTION

Figure 1A:
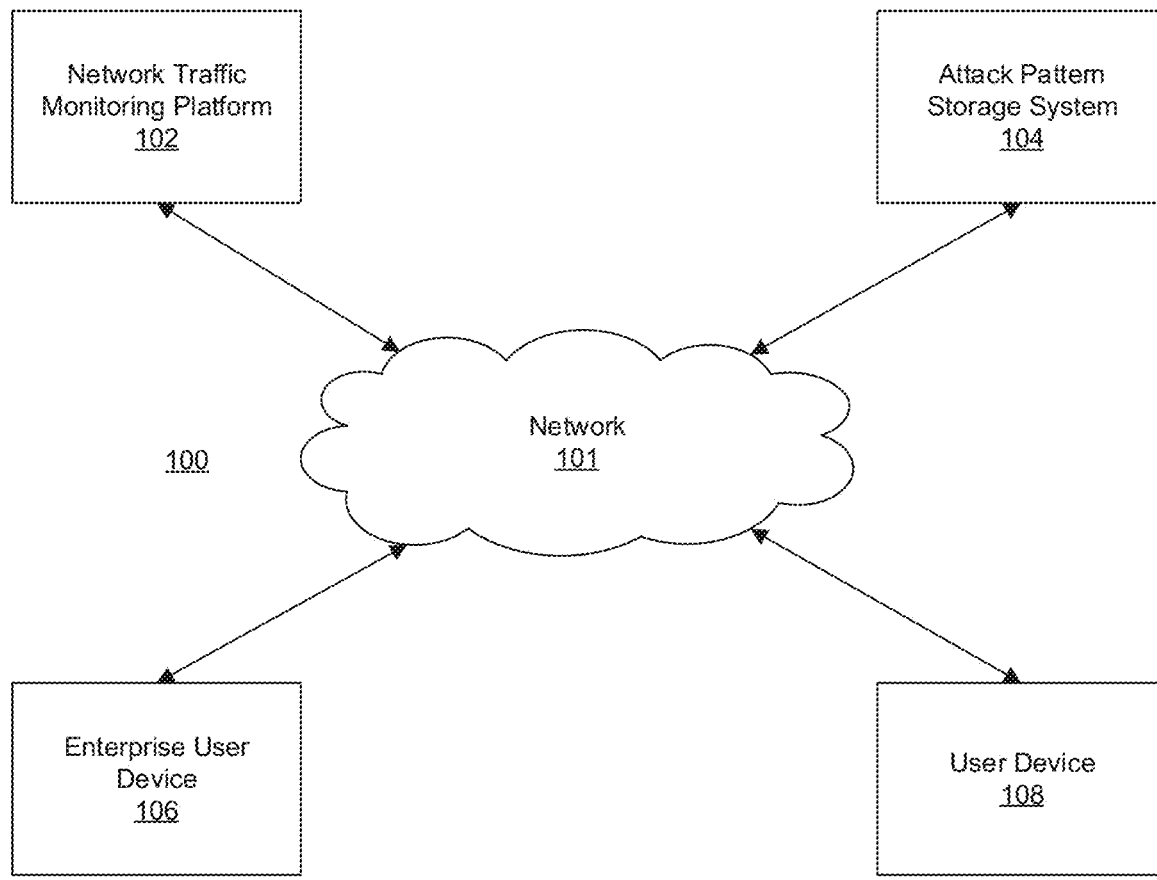
FIGS. 1A-1B depict an illustrative computing environment for generating password complexity rules based on attack pattern analysis using hash segmentation in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a system for generating password complexity rules. Service providers (e.g., an enterprise organization, such as a financial institution and/or other institutions) may improve security (e.g., by assisting users in generating passwords of increasing complexity) by maintaining a password enforcement policy which includes password complexity rules. Password complexity rules may vary from application to application, but the rules themselves may remain static within each application by nature. Most password complexity rules may consist of combinations of alphanumeric and special characters, prohibitions on re-using the last N passwords of the user, where N is some number set by the rules, and/or other rules. Overall, this system of generating complex passwords is outdated, because attackers constantly find new ways to crack passwords (e.g., by using techniques such as password spraying attacks). There exists a strong need to move away from static password complexity rules and create systems and arrangements for dynamically generating rules that can provide improved security. Such systems and arrangements may include a system that analyzes the attack pattern employed by hostile actors (e.g., by analyzing parameters associated with failed authentication attempts), in order to build stronger complexity rules (e.g., by imposing additional restrictions and/or requirements on password creation responsive to attacks). However, analyzing the attack patterns may be difficult because passwords might not be stored as plain text in computer systems, but rather as password hashes. Accordingly, a system may use hash segmentation techniques, assisted by an attack pattern analysis model trained based on historical password hashes, in order to analyze the password hashes.

Service providers may employ the system described above by monitoring failed authentication attempts in the network traffic of a network, to identify spikes in the failure rate of authentication attempts that exceed some threshold value. In some instances, these spikes may indicate that the password associated with the spike is potentially part of an attack (e.g., a password spray attack, and/or other methods of attacking a password). In these instances, the service provider may wish to update their password enforcement policy with new password complexity rules that prevent users from creating passwords identical to the password used in the attack. Accordingly, the system may extract the password hash corresponding to the password associated with the spike and use the attack pattern analysis model to segment the password hash. In some instances, the system may segment the password hash by generating behavior profiles that include data of a range of parameters (e.g., typing rate, request timestamps, error rates, and/or other parameters) relating to the password hash's use in the failed authentication attempts. The system may further generate a cumulative attack score for the password hash based on the parameters in the behavior profile and compare this attack score to a threshold value. For example, the system may assign different weights to different parameters in the behavior profile and generate the cumulative attack score based on a weighted average. In doing so, the system may identify whether or not the password failure rate spike corresponds to an actual attack.

When the cumulative attack score indicates that the password failure rate spike corresponds to an actual attack (i.e., the password hash is designated as an attacked hash), the system may generate new password complexity rules based on the password hash. For example, if a password hash includes a four letter word and three numbers in sequence, the system may generate a rule restricting users from proposing new passwords containing that same word and number sequence. The system may continue to train the attack pattern analysis model based on the attacked hash in order to improve the efficiency of the attack pattern analysis model. For example, if a parameter was assigned a certain weight in generating the cumulative attack score for the attacked hash based on the value of the parameter, the attack pattern analysis model may assign the same weight to the parameter for future password hashes based on identifying the parameter has the same value.

Figure 1B:
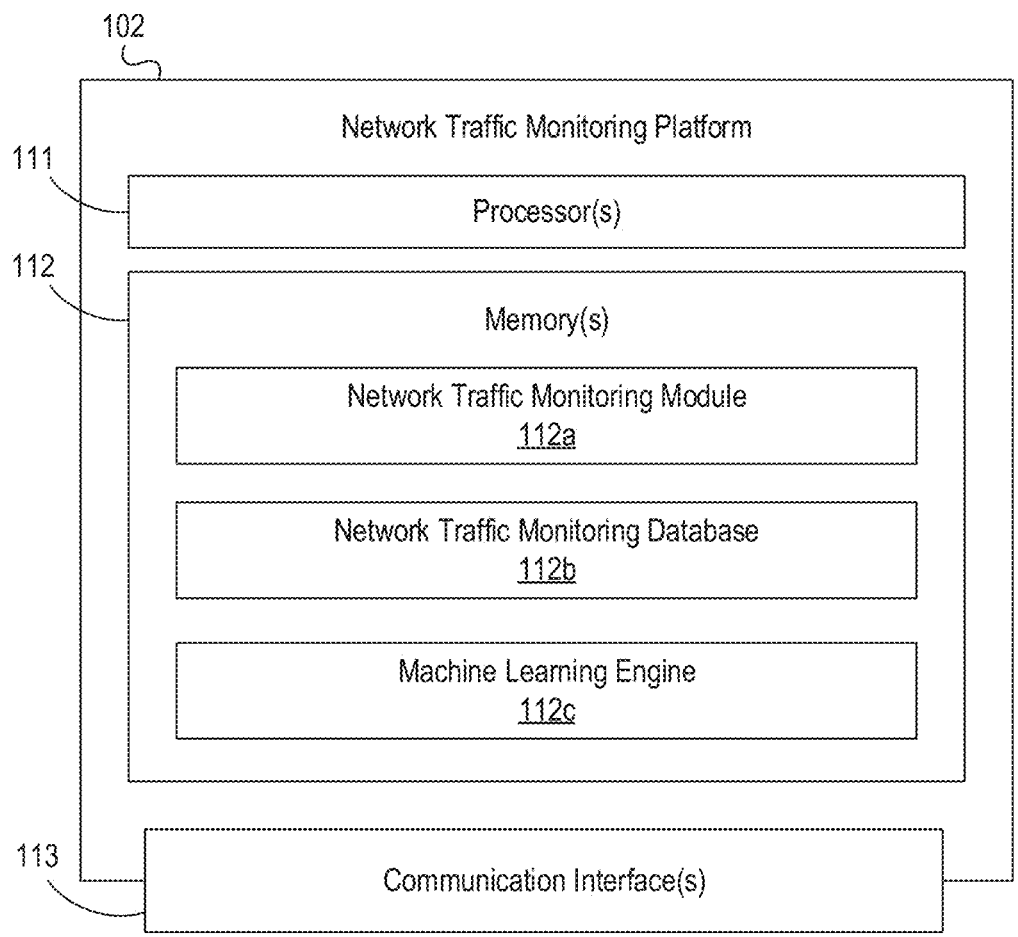

FIGS. 1A-1B depict an illustrative computing environment for generating password complexity rules based on attack pattern analysis using hash segmentation in accordance with one or more example arrangements. Referring to FIG. 1A, computing environment 100 may include one or more computer systems. For example, computing environment 100 may include a network traffic monitoring platform 102, an attack pattern storage system 104, an enterprise user device 106, and a user device 108.

As described further below, network traffic monitoring platform 102 may be a computer system that includes one or more computing devices (e.g., servers, server blades, or the like) and/or other computer components (e.g., processors, memories, communication interfaces) that may be used to configure, train and/or execute one or more machine learning models (e.g., an attack pattern analysis model). For example, the network traffic monitoring platform 102 may train the one or more machine learning models to generate a behavior profile corresponding to a plurality of parameters for a password hash. Additionally, the network traffic monitoring platform 102 may train the one or more machine learning models to generate a cumulative attack score for a password hash (e.g., indicating a likelihood that the password hash has been attacked). In some instances, network traffic monitoring platform 102 may be controlled or otherwise maintained by an enterprise organization (e.g., a financial institution, and/or other institutions). Although shown as an independent computing platform, in some instances, the network traffic monitoring platform 102 may be part of and/or otherwise integrated into the enterprise user device 106 without departing from the scope of the disclosure.

Attack pattern storage system 104 may be and/or otherwise include one or more computing devices (e.g., servers, server blades, and/or other devices) and/or other computer components (e.g., processors, memories, communication interfaces) that may be used to create, host, modify, and/or otherwise validate an organized collection of data (e.g., a database). The attack pattern storage system 104 may be synchronized across multiple nodes (e.g., sites, institutions, geographical locations, and/or other nodes) and may be accessible by multiple users (who may, e.g., be employees or clients of an enterprise organization such as a financial institutions). The data stored at the attack pattern storage system 104 may include any of the data (e.g., proposed password hashes, and/or other information) stored at and/or created by user device 108, the data extracted from the network 101 by network traffic monitoring platform 102 (e.g., secure password hashes, attacked password hashes, historical password hashes, and/or other information) and/or any additional data. In some instances, the attack pattern storage system 104 may be accessed by, validated by, and/or modified by any of, network traffic monitoring platform 102, user device 108, and/or other devices. Although shown as an independent database, in some instances, the attack pattern storage system 104 may be part of and/or otherwise integrated into the enterprise user device 106 and/or the network traffic monitoring platform 102 without departing from the scope of the disclosure.

Enterprise user device 106 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer data between users and/or perform other user functions (e.g., requesting user input, providing override commands, and/or other functions). In one or more instances, enterprise user device 106 may correspond to an enterprise user (who may, e.g., be an employee of the enterprise organization, such as a financial institution and/or other institution). In one or more instances, the enterprise user device 106 may be configured to communicate with one or more systems (e.g., network traffic monitoring platform 102 and/or other systems) to perform a data transfer, provide override commands, and/or to perform other functions. In some instances, the enterprise user device 106 may be configured to display one or more graphical user interfaces (e.g., secure password notification interfaces, password hash designation interfaces, and/or other interfaces).

User device 108 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer data between users and/or perform other user functions (e.g., requesting user input, providing a proposed password, and/or other functions). In one or more instances, user device 108 may correspond to a first user (who may, e.g., be an employee or client of the enterprise organization, such as a financial institution and/or other institution). In one or more instances, the user device 108 may be configured to communicate with one or more systems (e.g., network traffic monitoring platform 102 and/or other systems) to perform a data transfer, propose a new password, and/or to perform other functions. In some instances, the user device 108 may be configured to display one or more graphical user interfaces (e.g., user password interfaces, and/or other interfaces).

Computing environment 100 also may include one or more networks, which may interconnect network traffic monitoring platform 102, attack pattern storage system 104, enterprise user device 106, and user device 108. For example, computing environment 100 may include a network 101 (which may interconnect, e.g., network traffic monitoring platform 102, attack pattern storage system 104, enterprise user device 106, and user device 108). In some instances, the network 101 may include network traffic information (e.g., information corresponding to authentication attempts, and/or other information) between one or more devices connected via the network 101.

In one or more arrangements, network traffic monitoring platform 102, attack pattern storage system 104, enterprise user device 106, and user device 108 may be any type of computing device capable of sending and/or receiving requests and processing the requests accordingly. For example, network traffic monitoring platform 102, attack pattern storage system 104 enterprise user device 106, and user device 108, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of network traffic monitoring platform 102, attack pattern storage system 104, enterprise user device 106, and user device 108, may, in some instances, be special-purpose computing devices configured to perform specific functions.

Referring to FIG. 1B, network traffic monitoring platform 102 may include one or more processors 111, memory 112, and communication interface 113. A data bus may interconnect processor 111, memory 112, and communication interface 113. Communication interface 113 may be a network interface configured to support communication between network traffic monitoring platform 102 and one or more networks (e.g., network 101, or the like). Communication interface 113 may be communicatively coupled to the processor 111. Memory 112 may include one or more program modules having instructions that, when executed by processor 111, cause network traffic monitoring platform 102 to perform one or more functions described herein and/or one or more databases (e.g., attack pattern storage system 104, or the like) that may store and/or otherwise maintain information which may be used by such program modules and/or processor 111. In some instances, the one or more program modules and/or databases may be stored by and/or maintained in different memory units of network traffic monitoring platform 102 and/or by different computing devices that may form and/or otherwise make up network traffic monitoring platform 102. For example, memory 112 may have, host, store, and/or include network traffic monitoring module 112a, network traffic monitoring database 112b, and machine learning engine 112c.

Network traffic monitoring module 112a may have instructions that direct and/or cause network traffic monitoring platform 102 to generate password complexity rules based on attack pattern analysis using hash segmentation. Network traffic monitoring database 112b may have instructions causing network traffic monitoring platform 102 to store password hashes, behavior profiles, and/or cumulative attack scores (that may, e.g., be used to generate password complexity rules based on attack pattern analysis using hash segmentation). Machine learning engine 112c may contain instructions causing network traffic monitoring platform 102 to train, implement, and/or update a machine learning model, such as attack pattern analysis model, (that may, e.g., be used to generate password complexity rules based on attack pattern analysis using hash segmentation). In some instances, machine learning engine 112c may be used by network traffic monitoring platform 102 and/or network traffic monitoring module 112a to refine and/or otherwise update methods for generating password complexity rules based on attack pattern analysis using hash segmentation, and/or other methods described herein.

Figure 2A:
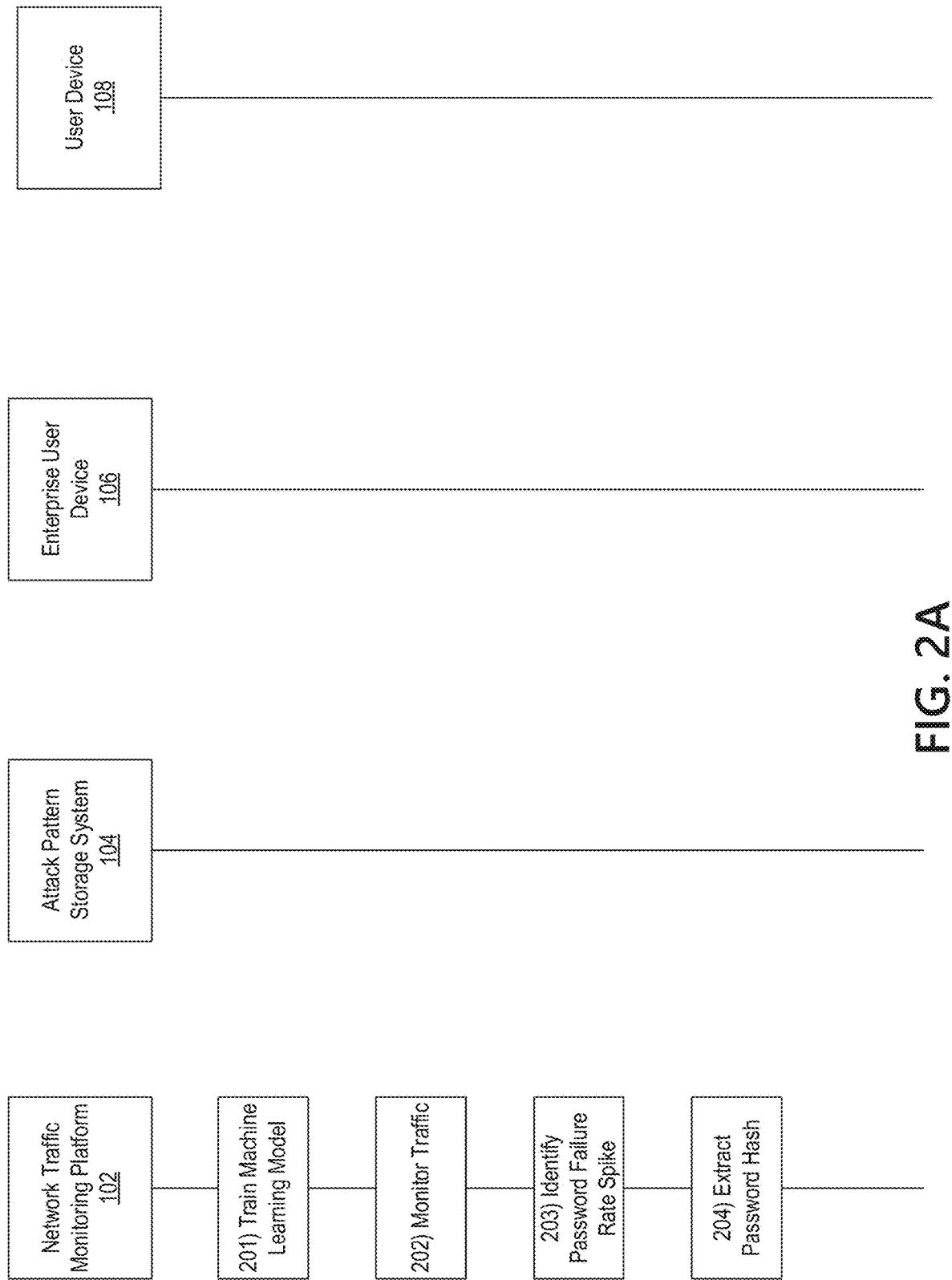
FIGS. 2A-2E depict an illustrative event sequence for generating password complexity rules based on attack pattern analysis using hash segmentation in accordance with one or more example arrangements.

FIGS. 2A-2E depict an illustrative event sequence for generating password complexity rules based on attack pattern analysis using hash segmentation in accordance with one or more example arrangements. Referring to FIG. 2A, at step 201, the network traffic monitoring platform 102 may train an attack pattern analysis model to output a behavior profile (e.g., corresponding to a plurality of parameters) and a cumulative attack score. In some instances, the network traffic monitoring platform 102 may configure and/or otherwise train the attack pattern analysis model based on historical password hashes on which the network traffic monitoring platform 102 has previously performed password complexity rule generation operations (which may, e.g., be received from a central repository, such as attack pattern storage system 104, and/or other repositories). In some instances, to configure and/or otherwise train the attack pattern analysis model, the network traffic monitoring platform 102 may process the historical password hashes by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the network traffic monitoring platform 102 may train the attack pattern analysis model to output behavior profiles corresponding to a plurality of parameters and a cumulative attack score.

For example, in configuring and/or otherwise training the attack pattern analysis model, the network traffic monitoring platform 102 may identify information (e.g., a weighted value, and/or other information) of one or more parameters corresponding to behavior profiles associated with the historical password hashes (e.g., data duplication, speed of interaction, typing pattern, error rate, vicinity of request source, mouse dynamics, event sequence analysis, request data patterns, browser configuration, operating system configuration, device battery level, request payload pattern, request timestamp duplication, request timestamp pattern, trust of a source internet protocol, and/or other parameters). For instance, the network traffic monitoring platform 102 may identify that a typing speed parameter with a value of 40 words per minute corresponds to a lower weighted value (e.g., a value of 1) than a typing speed parameter with a value of 60 words per minute (e.g., which corresponds to a weighted value of 5). Additionally or alternatively, the network traffic monitoring platform 102 may identify that the mere presence of a parameter (e.g., a same battery level across multiple devices) corresponds to a weighted value (e.g., a value of 1) while the lack of a parameter (e.g., different battery levels across multiple devices) corresponds to a lower weighted value (e.g., a value of 0). In identifying information, the network traffic monitoring platform 102 may input the historical password hashes into the attack pattern analysis model. For example, the network traffic monitoring platform 102 may identify that four behavior profiles associated with the historical password hashes correspond to a same parameter (e.g., the presence of a recognized source internet protocol (IP)), and that for each behavior profile the same parameter was assigned a particular weighted value. The network traffic monitoring platform 102 may then train the attack pattern analysis model to assign that parameter the same weighted value when said parameter is one of the plurality of parameters corresponding to a behavior profile generated by the attack pattern analysis model for a password hash.

Additionally or alternatively, in configuring and/or otherwise training the attack pattern analysis model the network traffic monitoring platform 102 may input the historical password hashes into the attack pattern analysis model. Based on inputting the historical password hashes into the attack pattern analysis model, the network traffic monitoring platform 102 may identify cumulative attack scores corresponding to the historical password hashes. For example, the network traffic monitoring platform 102 may identify that a historical password hash received a particular cumulative attack score based on the values of a plurality of parameters. The network traffic monitoring platform 102 may train the attack pattern analysis model to generate the same cumulative attack score for password hashes that correspond to the same values of the same plurality of parameters. Additionally or alternatively, the network traffic monitoring platform 102 may train the attack pattern analysis model to generate a different cumulative attack score for password hashes, but to generate the different cumulative attack score based in part on the cumulative attack score of the historical password hash. For example, the network traffic monitoring platform 102 may mine the historical password hash to identify that its cumulative attack score is based in part on a particular weighted value being assigned to a particular parameter. The network traffic monitoring platform 102 may then assign the same weighted value to the particular parameter when generating a cumulative attack score for a password hash.

At step 202, the network traffic monitoring platform 102 may monitor network traffic. For example, the network traffic monitoring platform 102 may monitor traffic of the network 101 (e.g., data packets sent and received via the network 101). The network traffic monitoring platform 102 may monitor the network traffic via the communication interface 113 and while the first wireless data connection is established. In monitoring the network traffic, the network traffic monitoring platform 102 may monitor a password failure rate. In some examples, the network traffic monitoring platform 102 may continuously or near-continuously monitor a password failure rate. For example, in some instances the network traffic monitoring platform 102 may continuously gather information of a number of failed authentication attempts requested by a user, embedded within the network traffic, and using a particular password (e.g., the same particular password was used in at least, for instance, 30 failed authentication attempts embedded in the network traffic). In some examples, the network traffic monitoring platform 102 may store the information of the number of failed authentication attempts in internal memory of the network traffic monitoring platform 102, and/or external memory.

At step 203, in monitoring the network traffic, the network traffic monitoring platform 102 may identify a password failure rate spike. In identifying the password failure rate spike, the network traffic monitoring platform 102 may compare the password failure rate for a particular password to a threshold value. Based on identifying that the password failure rate exceeds the threshold value, the network traffic monitoring platform 102 may identify a password failure rate spike. For example, the threshold value may indicate an average and/or expected password failure rate (e.g., 5% of authentication attempts using the particular password fail). In this example, if the network traffic monitoring platform 102 monitors the network traffic and detects that a password failure rate exceeds this average and/or expected password failure rate (e.g., the network traffic monitoring platform 102 detects that 20% of the authentication attempts using the particular password fail) the network traffic monitoring platform 102 may identify a password failure rate spike corresponding to the particular password. The network traffic monitoring platform 102 may perform attack pattern analysis using hash segmentation on the particular password (e.g., using the methods described below at steps 204-222). In some instances, in monitoring the network traffic, the network traffic monitoring platform 102 may identify multiple password failure rate spikes. In these instances, the network traffic monitoring platform 102 may perform attack pattern analysis using hash segmentation on multiple passwords (e.g., by repeatedly using the methods described below at steps 204-222).

Additionally, in some examples the network traffic monitoring platform 102 may identify a device signature associated with the password failure rate spike based on the network traffic. For example, the network traffic monitoring platform 102 may identify that 3 out of 5 failed authentication attempts correspond to a same device signature associated with a particular device. Based on identifying the device signature associated with the password failure rate spike, the network traffic monitoring platform 102 may configure a device attack list. The device attack list may include one or more historical device signatures the network traffic monitoring platform 102 has previously identified. In configuring the device attack list, the network traffic monitoring platform 102 may add the device signature to the device attack list. Based on the device attack list, the network traffic monitoring platform 102 may reject password change requests (e.g., proposed passwords) corresponding to user devices included in the device attack list.

At step 204, the network traffic monitoring platform 102 may extract a password hash (e.g., a first password hash) associated with a password failure rate spike (e.g., the password failure rate spike identified at step 203, as described above). In extracting the password hash, the network traffic monitoring platform 102 may process information embedded within the network traffic (e.g., information of failed authentication attempts, and/or other information) and identify, based on the processed information, the stored hash value of the password used in the failed authentication attempts that triggered the password failure rate spike. For example, the network traffic monitoring platform 102 may identify a hash value (e.g., an MD5 value, a SHA-2 value, a CRC32 value, and/or other hash value) that corresponds to a particular alphanumeric password. In extracting the password hash, the network traffic monitoring platform 102 may additionally extract information and/or values of a plurality of parameters corresponding to the password hash. For example, the network traffic monitoring platform 102 may extract information and/or values of the plurality of parameters based on the failed authentication attempts (e.g., mouse dynamics, typing pattern, speed of interaction, and/or other information of the plurality of parameters).

In some examples, in extracting the password hash, the network traffic monitoring platform 102 may identify a frequency score corresponding to the password hash associated with the password failure rate spike based on the network traffic. In these examples, the frequency score may indicate a number of authentication attempts corresponding to the password hash and may be one or more of: an integer value, a binary value, a decimal value, a fractional value, a percentile value, and/or other values. For example, the network traffic monitoring platform 102 may identify that the password hash associated with the password failure rate spike was used in 3 out of 5 authentication attempts (e.g., attempts to login to a network), and may identify a frequency score of 60%. The network traffic monitoring platform 102 may additionally compare the frequency score to a failure rate threshold that may, e.g., be determined by a user (e.g., an enterprise user, such as the user of enterprise user device 106 and/or other users). Based on identifying that the frequency score meets or exceeds the failure rate threshold, the network traffic monitoring platform 102 may store the password hash (e.g., in internal memory of the network traffic monitoring platform 102, and/or other memory) and progress to step 205.

Figure 2B:
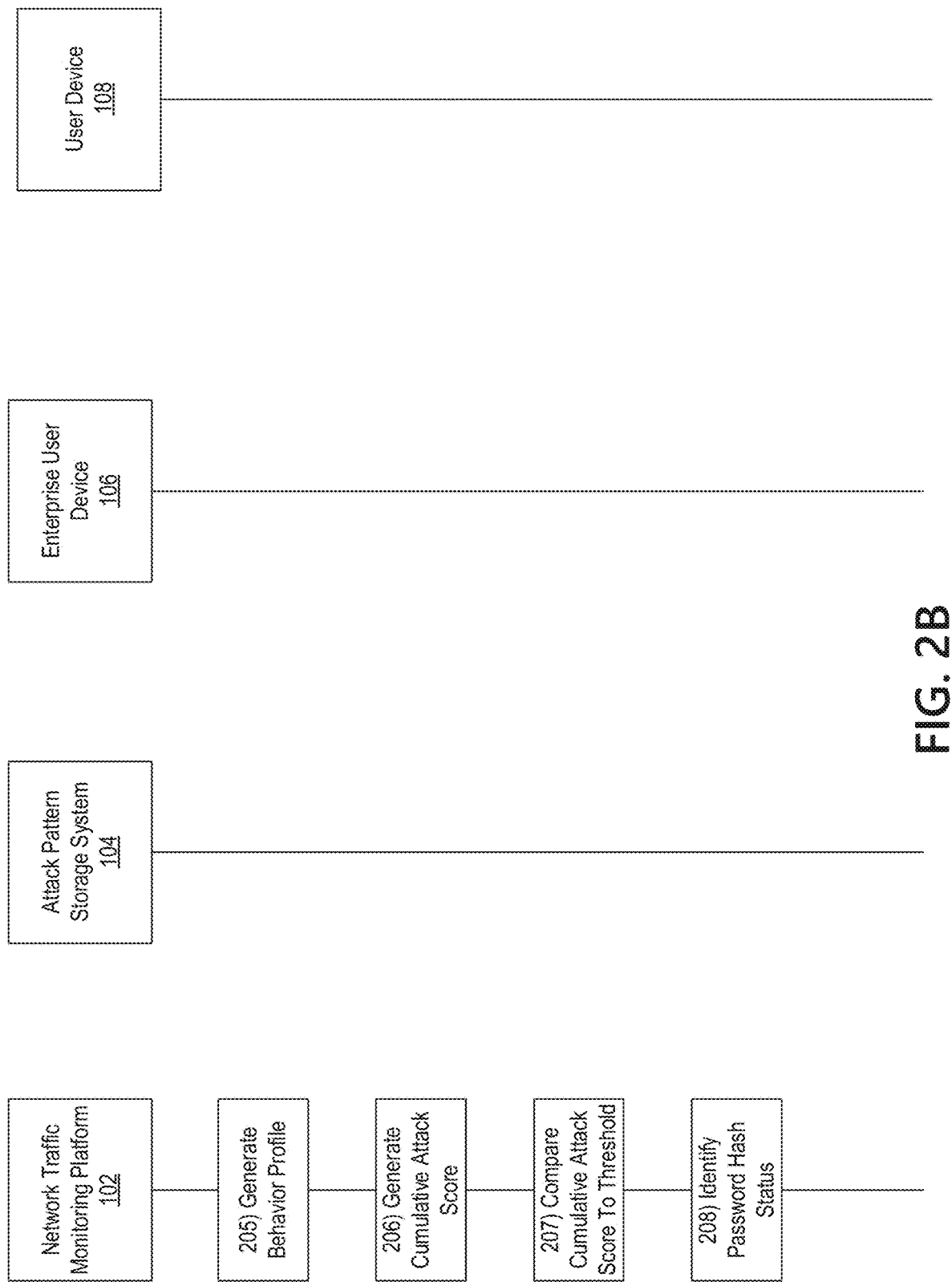

Referring to FIG. 2B, at step 205, the network traffic monitoring platform 102 may generate a behavior profile (e.g., a first behavior profile, corresponding to a first plurality of parameters). In generating the behavior profile, the network traffic monitoring platform 102 may input the password hash and the information and/or values of the plurality of parameters corresponding to the password hash into the attack pattern analysis model. In generating the behavior profile, the network traffic monitoring platform 102 may further use some or all of the information and/or values of the plurality of parameters extracted from the network traffic (e.g., as described above at step 204). For example, the network traffic monitoring platform 102 may generate a list of the plurality of parameters and associate each of the plurality of parameters to a corresponding value. In one or more instances, the values corresponding to the plurality of parameters may be extracted from the network traffic (e.g., as described above at step 204). Additionally or alternatively, in some examples the values corresponding to the plurality of parameters may be preset values determined by a user of network traffic monitoring platform 102 (e.g., an employee of the enterprise organization deploying network traffic monitoring platform 102, such as an administrator, and/or other employees). For example, one of the plurality of parameters may be which operating system (OS) configuration corresponds to the failed authentication attempts. In this example, the user of the network traffic monitoring platform 102 may have predetermined that the presence of a particular OS corresponds to a value of 1, while the presence of any other OS corresponds to a value of 0, and instructed the attack pattern analysis model to generate the behavior profile accordingly. In one or more instances, the values corresponding to the plurality of parameters may be or have one or more of: a numerical value, a percentile/percentage value, a binary value, and/or other values.

Additionally or alternatively, in some examples, the network traffic monitoring platform 102 may have previously trained the attack pattern analysis model to employ a behavior profile algorithm to generate the behavior profile. In some instances, the behavior profile algorithm may use some or all of the information extracted from the network traffic. For example, the attack pattern analysis model may execute the behavior profile algorithm using the following constraints/parameters:

> If (time gap of keystroke 1 to keystroke 2)+(time gap of keystroke 2 to keystroke 3)+ . . . (time gap of keystroke $N$–1 to keystroke $N$)=(time gap of keystroke 1 to keystroke 2)*$N$, then Parameter: Typing Pattern=1. If else, then Parameter:Typing Pattern=0.

In this example, if the sum of the time gaps between each of the N keystrokes in the password hash corresponding to the password failure rate spike is equivalent to the product of the time gap between the first two keystrokes and the number (N) of total keystrokes (i.e., the time gaps between each keystroke are equivalent), then the attack pattern analysis model may assign the typing pattern parameter a value of 1. The value of 1 may indicate the presence of a consistent time gap between keystrokes (which may, e.g., be indicative of an automated attack using the password hash). In this example, the typing pattern parameter may subsequently be added to the behavior profile. Note that the above example is merely one algorithm the attack pattern analysis model may be trained to employ in order to generate the behavior profile and in one or more instances additional or alternative algorithms may be employed and/or may correspond to different parameters.

Examples of these parameters are shown, for example, in table 300 (which is shown in FIG. 3). As described above, these may be examples of some parameters of the plurality of parameters used by network traffic monitoring platform 102 to generate the behavior profile, and descriptions of the examples of the plurality of parameters. Note that the table 300 in FIG. 3 is merely an illustrative example, and in one or more instances the network traffic monitoring platform 102 may include some or all of the examples of the plurality of parameters in the behavior profile, and/or include additional parameters not listed in the table 300 of FIG. 3.

At step 206, the network traffic monitoring platform 102 may generate a cumulative attack score for the password hash (e.g., a first cumulative attack score for the first password hash) based on analyzing the behavior profile. In some instances, the cumulative attack score may be based on some or all of the plurality of parameters present in the behavior profile. For example, the network traffic monitoring platform 102 may use the attack pattern analysis model to identify that the parameters of speed of interaction, typing pattern, and error rate all correspond to positive values in the behavior profile. In this example, the attack pattern analysis model may increase the value of the cumulative attack score based on the positive values.

In generating the cumulative attack score, the attack pattern analysis model may generate the cumulative attack score as an integer value, percentage value, decimal value, hexadecimal value, binary value, and/or other representations of the cumulative attack score. In some examples, the network traffic monitoring platform 102 may have previously trained the attack pattern analysis model to employ an attack score algorithm to determine the cumulative attack score. In some instances, the attack score algorithm may use some or all of the information included in the behavior profile. In some instances, in employing the attack score algorithm, the attack pattern analysis model may be trained to assign weights to the values corresponding to the plurality of parameters included in the behavior profile and generate the cumulative attack score based on the weighted values. For example, the attack pattern analysis model may execute the following attack score algorithm:

Cumulative Attack Score=$A$*value of parameter 1+$B$*value of parameter 2+$C$*value of parameter 3, where A, B, and C are weighted values corresponding to parameter 1, parameter 2, and parameter 3, respectively.

In some examples, different parameters may correspond to different weights. For example, an error rate parameter may correspond to a value of 0.60, while a device battery level parameter may correspond to a value of 100 (e.g., indicating that 100 devices associated with the password failure rate spike possessed a same battery level). In this example, the attack pattern analysis model may assign a weight of 100 to the error rate parameter, and a weight of 1 to the device battery level parameter, based on a determination (that may, e.g., be made by a user of network traffic monitoring platform 102, such as an employee of the enterprise organization, and/or other users) that the parameters should correspond to weighted values on the same order of magnitude. In this example, the weighted value of the error rate parameter would be 60, while the weighted value of the device battery level parameter would be 100. In some instances, the weights may be determined by the user of the network traffic monitoring platform 102 (who may, e.g., be an employee of the enterprise organization, such as the user of enterprise user device 106, and/or other users) and/or automatically identified.

Figure 4:
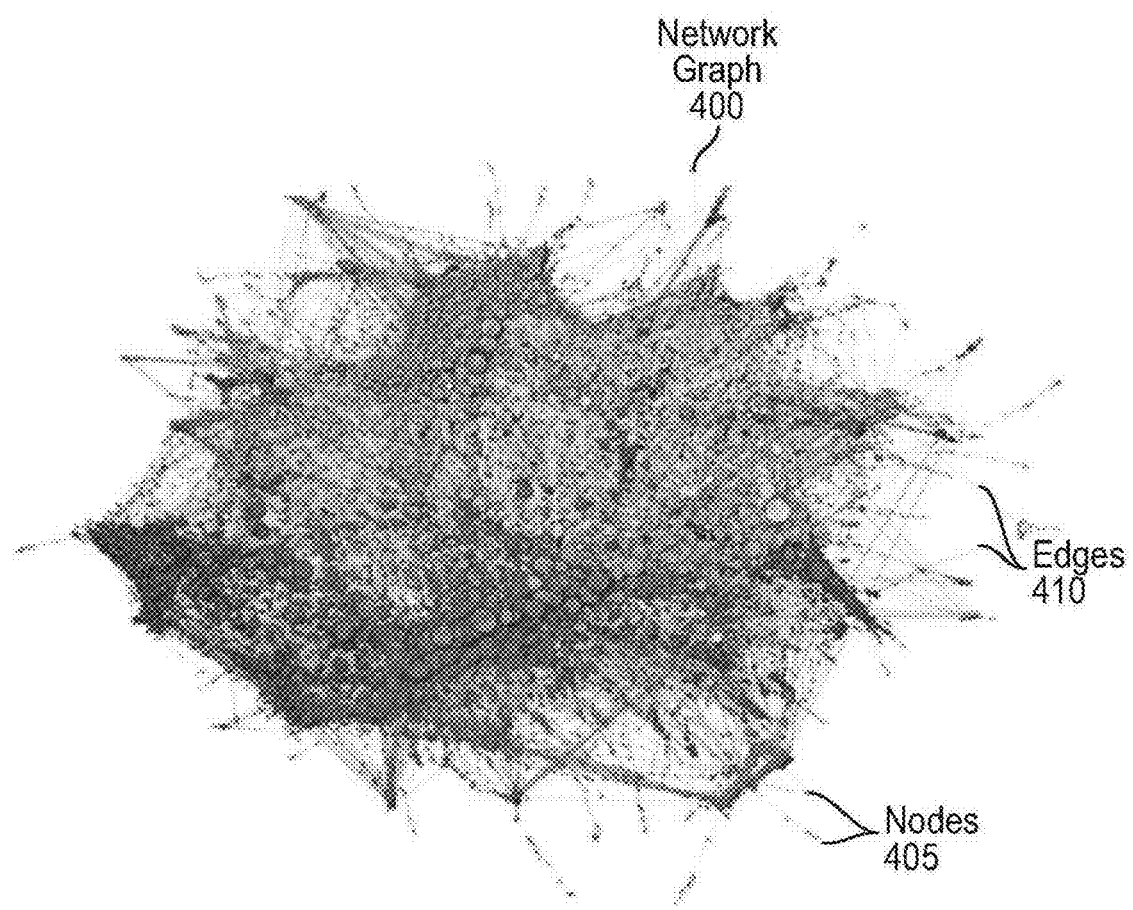
FIG. 4 depicts an illustrative network graph used to perform behavioral analysis while generating password complexity rules based on attack pattern analysis using hash segmentation in accordance with one or more example arrangements.

Additionally or alternatively, in some instances, the network traffic monitoring platform 102 may retrieve a plurality of additional attacked hashes from the attack pattern storage system 104. For example, the network traffic monitoring platform 102 may retrieve the plurality of additional attacked hashes from the attack pattern storage system 104 via the communication interface 113 and while a wireless data connection is established. The plurality of additional attacked hashes may be password hashes on which the network traffic monitoring platform 102 has previously performed password complexity rule generation operations. In these instances, the network traffic monitoring platform 102 may perform behavioral analysis operations based on the attacked hash and the plurality of additional attacked hashes. For example, in some instances, the network traffic monitoring platform 102 may build a network graph, such as network graph 400 (which is shown in FIG. 4) using the attacked hash and the plurality of additional attacked hashes. The network graph 400 may comprise a plurality of nodes (such as nodes 405, as shown in FIG. 4) and a plurality of edges (such as edges 410, as shown in FIG. 4), where each of the plurality of nodes corresponds to a parameter (e.g., one of the plurality of parameters included in the behavior profile, as illustrated at FIG. 3, and/or other parameters) and each of the plurality of edges corresponds to a hash (e.g., the attacked hash, one or more of the plurality of additional attacked hashes, and/or other hashes).

In these instances, the network traffic monitoring platform 102 may shade the network graph based on a concentration of the plurality of edges and the plurality of nodes. For example, higher concentrations of edges and/or nodes may correspond to a dark shading, while lower concentrations of edges and/or nodes may correspond to a light shading. A high concentration of edges and/or nodes may indicate that the corresponding password hashes and/or parameters are associated with unauthorized access attempts with a greater frequency than the password hashes and/or parameters corresponding to a low concentration of edges and/or nodes. The network traffic monitoring platform 102 may additionally update the cumulative attack score based on the coloring and the attacked hash. For example, the network traffic monitoring platform 102 may identify that the attacked hash corresponds to a dark shading on the network graph. A dark shading may, in some examples, indicate that a majority of the plurality of additional attacked hashes corresponded to the same parameters as the attacked hash, which may, e.g., indicate an increased likelihood that the attacked hash was used as part of an unauthorized access attempt (e.g., a password spray attack, and/or other attacks). Accordingly, the network traffic monitoring platform 102 may increase the cumulative attack score. Updating the cumulative attack score may improve the efficiency of the attack pattern analysis model, e.g. by allowing for increased accuracy in generating cumulative attack scores and identifying attacked hashes.

In some examples, the network traffic monitoring platform 102 may dynamically update the network graph. For example, the network traffic monitoring platform 102 may continuously monitor the network traffic for failed authentication attempts corresponding to the password hash. The network traffic monitoring platform 102 may update the parameters associated with the password hash based on the continuous monitoring of the network traffic. Accordingly, the network traffic monitoring platform 102 may update the plurality of nodes included in the network graph based on the updates to the parameters.

At step 207, the network traffic monitoring platform 102 may compare the cumulative attack score to a threshold value to determine whether or not the cumulative attack score meets or exceeds the threshold value. For example, a threshold value may be or have an integer value of 100. Identifying that the cumulative attack score meets or exceeds the threshold value may indicate that the password hash is an attacked hash and that the network traffic monitoring platform 102 should generate password complexity rules based on the attacked hash. Identifying that the cumulative score does not meet or exceed the threshold value (i.e., the cumulative attack score is below the threshold value) may indicate that the password hash is a secure hash and that the network traffic monitoring platform 102 should send a notification to an enterprise user device (e.g., enterprise user device 106) indicating that the password hash is a secure hash. In some examples, the threshold value may be a value configured by an enterprise user (e.g., the enterprise user of enterprise user device 106, and/or other enterprise users) and/or automatically identified. For example, a threshold value may have or be a value of 100, while the cumulative attack score may have or be a value of 150. The network traffic monitoring platform 102 may then identify that the cumulative attack score exceeds the threshold value.

In some instances, the threshold value may be a dynamic value. For example, the threshold value may change based on a given tolerance level. The given tolerance level may indicate a level of concern the enterprise user (and/or the enterprise organization employing the enterprise user) feels towards the password hash. For example, an increased level of concern that a password hash is vulnerable to attack may correspond to a decrease in the tolerance level, while a decreased level of concern that the password hash is vulnerable to attack may correspond to an increase in the tolerance level. In one example, the threshold value may initially have or be a value of 100. Based on an increased concern that the password hash is vulnerable to attack, the tolerance level may be decreased, and the threshold value may accordingly increase (e.g., to 105, and/or other values). Alternatively, based on a decreased concern that the password hash is vulnerable to attack, the tolerance level may be increased, and the threshold value may accordingly decrease (e.g., to 95, and/or other values). In some examples, the enterprise user may manually change the dynamic threshold value. Additionally or alternatively, the dynamic threshold value may automatically change (e.g., based on manual changes to the given tolerance level).

At step 208, the network traffic monitoring platform 102 may identify the password hash status, based on identifying whether or not the cumulative attack score meets or exceeds the threshold value (e.g., as described above at step 207). For example, the network traffic monitoring platform 102 may identify the password hash as either a secure hash, or an attacked hash, based on comparing the cumulative attack score to the threshold value. In some examples, based on identifying that the cumulative attack score is below the threshold value, the network traffic monitoring platform 102 may identify the password hash as a secure hash (which may, e.g., indicate that the password was not used in an unauthorized authentication attempt, such as a password spray attack). In some instances, based on identifying the password hash as a secure hash, the network traffic monitoring platform 102 may additionally send a notification to an enterprise user device (e.g., enterprise user device 106, and/or other enterprise user devices). The notification may be or include information indicating that a password failure rate spike occurred and that a comparison was performed. For example, the notification may include the password hash corresponding to the password failure rate spike, the cumulative attack score, the threshold value, and/or other information. The notification may also provide an option for manual user review. For example, in receiving the notification, the enterprise user may make a determination that the cumulative attack score was a sufficiently high value to indicate the password failure rate spike corresponded to an unauthorized access attempt, and the enterprise user may manually generate password complexity rules.

In some examples, in sending the notification to the enterprise user device (e.g., enterprise user device 106), the network traffic monitoring platform 102 may send one or more display commands directing the enterprise user device 106 to display a user interface. For example, the network traffic monitoring platform 102 may send the one or more display commands via the communication interface 113 and while a wireless data connection is established (e.g., as described at step 213 below). Based on or in response to the one or more commands to display the user interface, the enterprise user device 106 may display the user interface. For example, the enterprise user device 106 may display a secure password notification interface.

Figure 5A:
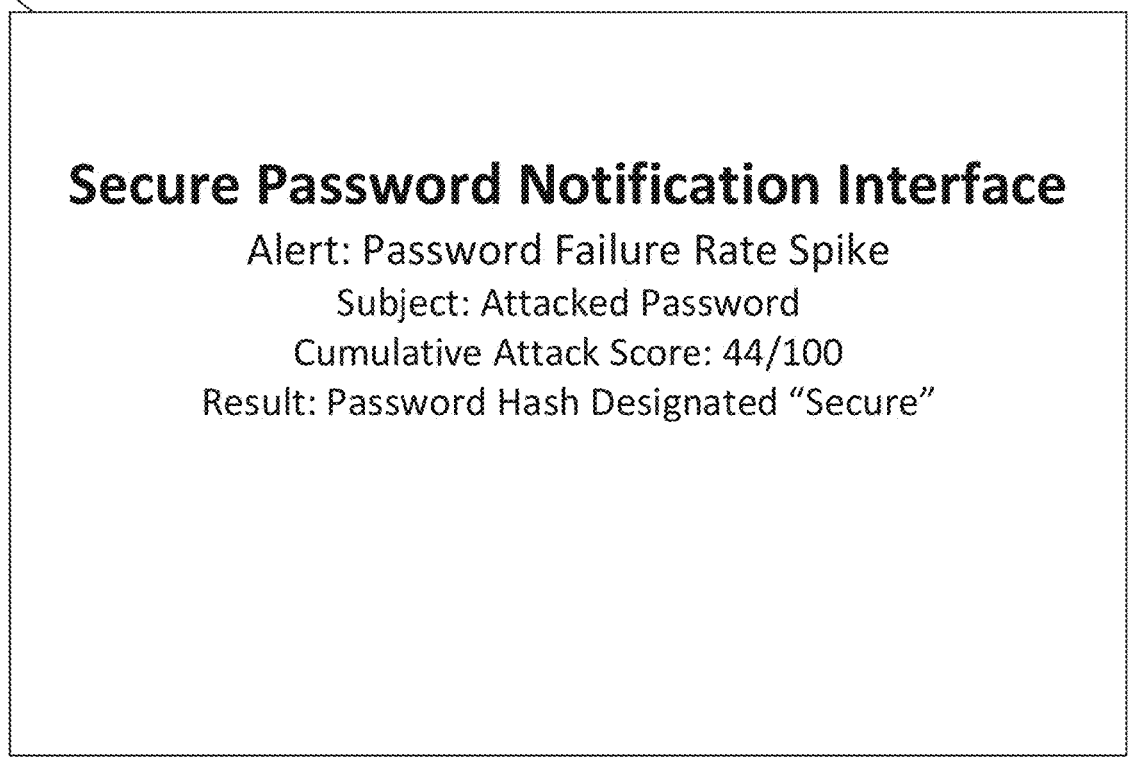

For example, in displaying a secure password notification interface, the enterprise user device (e.g., enterprise user device 106) may display a graphical user interface similar to secure password notification interface 500, which is illustrated in FIG. 5A. Referring to FIG. 5A, in some instances, the secure password notification interface 500 may include information corresponding to an identified password hash. For example, the secure password notification interface 500 may include information such as a notification that a password failure rate spike occurred, the password associated with the password hash corresponding to the password failure rate spike, the cumulative attack score, a current designation of the password hash (which may, e.g., correspond to the identification of the password hash, described above), and/or other information.

In instances where the cumulative attack score does not meet or exceed the threshold value, the network traffic monitoring platform 102 may proceed to step 213. In some instances, based on identifying that the cumulative attack score does meet or exceeds the threshold value, the network traffic monitoring platform 102 may identify the password hash as an attacked hash (which may, e.g., indicate that the password hash was used in an unauthorized authentication attempt, such as a password spray attack). In these instances, the network traffic monitoring platform 102 may proceed to step 209 and generate password complexity rules as described below at steps 209-213.

Figure 2C:
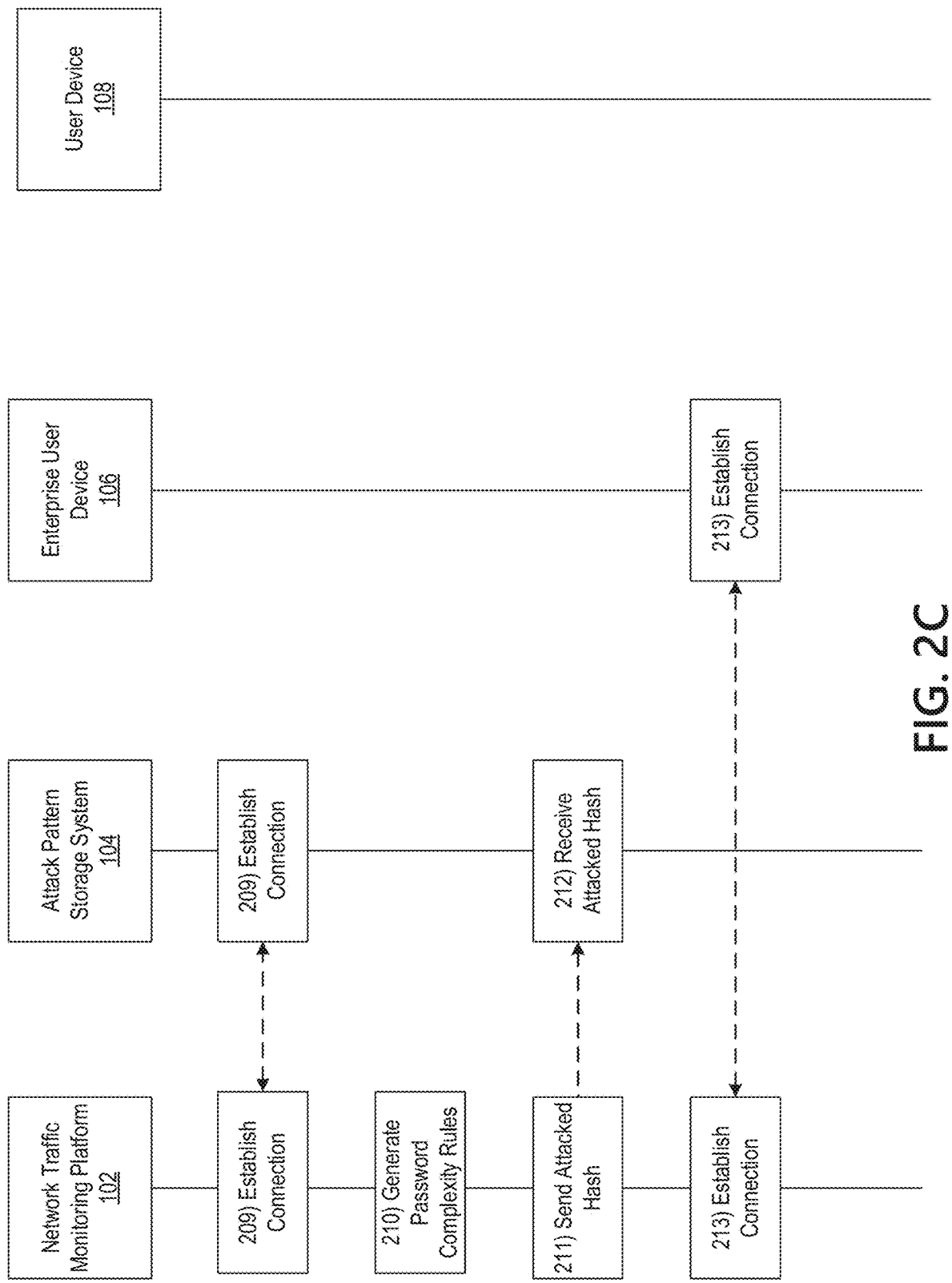

Referring to FIG. 2C, at step 209, network traffic monitoring platform 102 may establish a connection with attack pattern storage system 104. For example, network traffic monitoring platform 102 may establish a first wireless data connection with the attack pattern storage system 104 to link the attack pattern storage system 104 with the network traffic monitoring platform 102 (e.g., in preparation for storing password complexity rules, and/or other functions). In some instances, the network traffic monitoring platform 102 may identify whether or not a connection is already established with the attack pattern storage system 104. If a connection is already established with the attack pattern storage system 104, the network traffic monitoring platform 102 might not re-establish the connection. If a connection is not yet established with the attack pattern storage system 104, the network traffic monitoring platform 102 may establish the first wireless data connection as described above.

At step 210, the network traffic monitoring platform 102 may generate password complexity rules based on the attacked hash. For example, the network traffic monitoring platform 102 may generate a password complexity rule restricting users from generating passwords that include the attacked hash, which may result in increased security by preventing users from generating passwords that have previously been cracked (e.g., used in unauthorized access attempts, such as a password spray attack). In some instances, in generating the password complexity rules, the network traffic monitoring platform 102 may retrieve a plurality of additional attacked hashes from the attack pattern storage system 104. For example, the network traffic monitoring platform 102 may retrieve the plurality of additional attacked hashes from the attack pattern storage system 104 via the communication interface 113 and while the first wireless data connection is established. The plurality of additional attacked hashes may be password hashes that network traffic monitoring platform 102 has previously performed password complexity rule generation operations on. In some instances, the network traffic monitoring platform 102 may have previously retrieved the plurality of additional attacked hashes (e.g., as described above at step 206). In these instances, the network traffic monitoring platform 102 might not retrieve the plurality of additional attacked hashes a second time, and/or the network traffic monitoring platform 102 may retrieve a second plurality of additional attacked hashes different from the plurality of additional attacked hashes previously retrieved at step 206. In these examples, the network traffic monitoring platform 102 may identify, based on the attacked hash and the plurality of additional attacked hashes, one or more requirements corresponding to password creation (i.e., password complexity rules generated during previous password complexity rule generation operations and using the plurality of attacked hashes). For example, the network traffic monitoring platform 102 may identify one or more of: restrictions on included terms, restrictions on certain alphanumeric sequences, numeral inclusion requirements, special character inclusion requirements, letter case requirements, recency restrictions, length requirements, and/or other restrictions.

Additionally or alternatively, the network traffic monitoring platform 102 may update, based on the generated password complexity rules, and further based on the one or more requirements corresponding to password creation, a password enforcement policy. The password enforcement policy may be or include a set of password complexity rules previously established by an individual user and/or an organization (e.g., an enterprise organization, such as a financial institution and/or other institutions). For example, the password enforcement policy may be or include a pre-established set of password complexity rules (that may, e.g., have previously been generated by the network traffic monitoring platform 102). In updating the password enforcement policy, the network traffic monitoring platform 102 may replace, modify, or add to existing password complexity rules contained within the password enforcement policy.

At step 211, the network traffic monitoring platform 102 may send the attacked hash to the attack pattern storage system 104. For example, the network traffic monitoring platform 102 may send the attacked hash via the communication interface 113 and while the first wireless data connection is established. In sending the attacked hash, the network traffic monitoring platform 102 may additionally send the cumulative attack score corresponding to the attacked hash to the attack pattern storage system 104, in the manner described above. In some instances, the network traffic monitoring platform 102 may additionally send one or more commands directing the attack pattern storage system 104 to store the attacked hash (and, in some instances, the cumulative attack score) at the attack pattern storage system 104.

At step 212, the attack pattern storage system 104 may receive the attacked hash (and, in some instances, the cumulative attack score) from the network traffic monitoring platform 102. For example, the attack pattern storage system 104 may receive the attacked hash (and, in some examples, the cumulative attack score) via the communication interface 113 and while the first wireless data connection is established. In some instances, the attack pattern storage system 104 may additionally receive the one or more commands directing the attack pattern storage system 104 to store the attacked hash (and, in some instances, the cumulative attack score) which may cause the attack pattern storage system 104 to store the attacked hash and, in some instances, the cumulative attack score to memory (e.g., internal memory, and/or other memory).

At step 213, network traffic monitoring platform 102 may establish a connection with enterprise user device 106. For example, network traffic monitoring platform 102 may establish a second wireless data connection with enterprise user device 106 to link the enterprise user device 106 with the network traffic monitoring platform 102 (e.g., in preparation for sending display commands, and/or other functions). In some instances, the network traffic monitoring platform 102 may identify whether or not a connection is already established with the enterprise user device 106. If a connection is already established with the enterprise user device 106, the network traffic monitoring platform 102 might not re-establish the connection. If a connection is not yet established with the enterprise user device 106, the network traffic monitoring platform 102 may establish the second wireless data connection as described above.

Figure 2D:
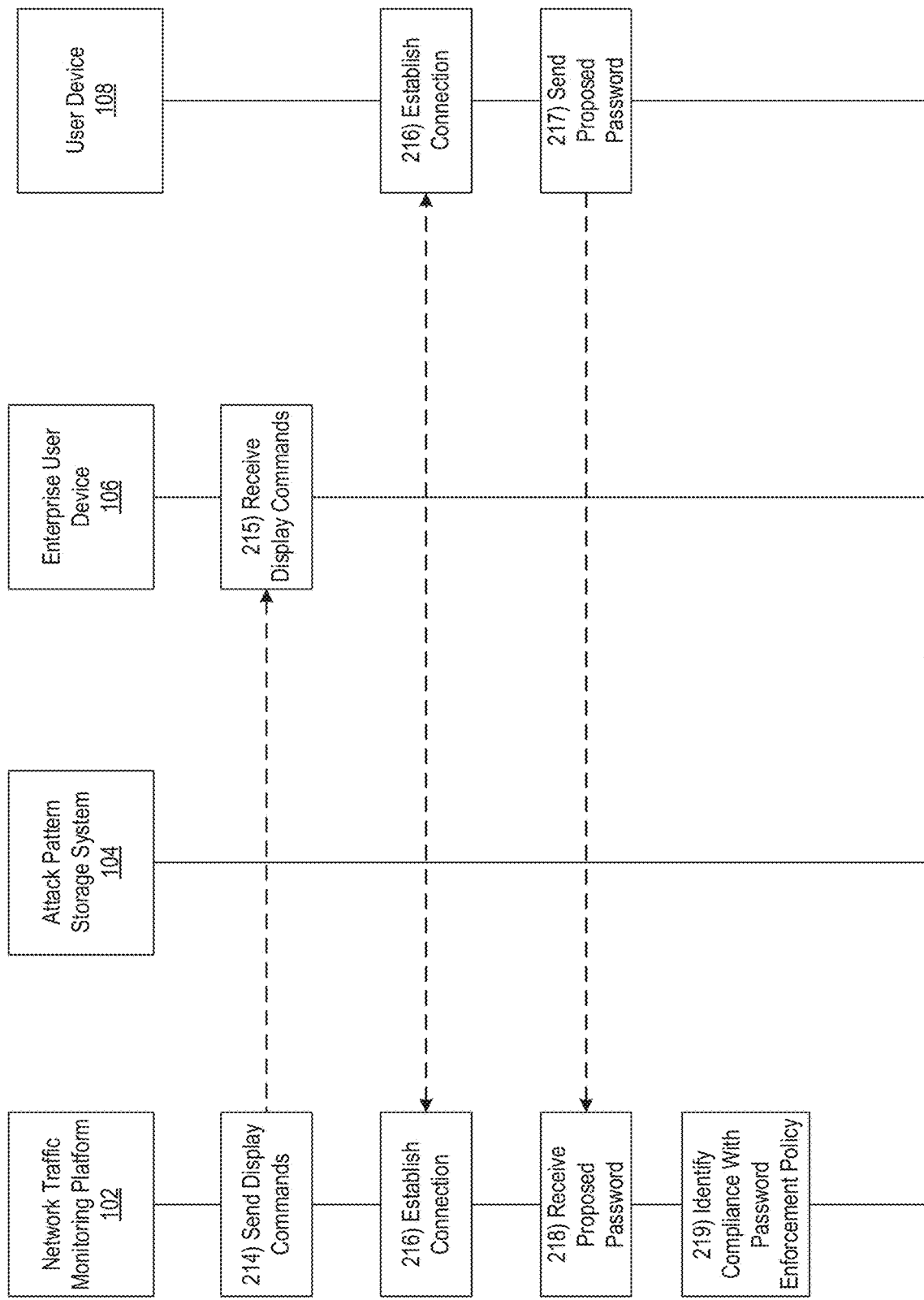

Referring to FIG. 2D, at step 214, the network traffic monitoring platform 102 may send one or more display commands to the enterprise user device 106, where the one or more display commands direct the enterprise user device 106 to display a user interface and request user input corresponding to a password hash designation (e.g., a secure hash designation, or an attacked hash designation). For example, the network traffic monitoring platform 102 may send the one or more display commands via the communication interface 113 and while the second wireless data connection is established.

At step 215, the enterprise user device 106 may receive the one or more display commands directing the enterprise user device 106 to display a user interface and request user input corresponding to a password hash designation. For example, the enterprise user device 106 may receive the one or more display commands via the communication interface 113 and while the second wireless data connection is established. Based on or in response to the one or more commands to display the user interface, the enterprise user device 106 may display the user interface. For example, the enterprise user device 106 may display a password hash designation interface. In some instances, the password hash designation interface may be configured to receive user input through the enterprise user device 106.

For example, in displaying a password hash designation interface, the enterprise user device 106 may display a graphical user interface similar to password hash designation interface 510, which is illustrated in FIG. 5B. Referring to FIG. 5B, in some instances, the password hash designation interface 510 may include information corresponding to an identified password hash. For example, the password hash designation interface 510 may include information such as a notification that a password failure rate spike occurred, the password associated with the password hash corresponding to the password failure rate spike, the cumulative attack score, a current designation of the password hash (which may, e.g., correspond to the identification of the password hash, described at step 208), and/or other information. The password hash designation interface 510 may also display interface elements or selectable options requesting user input. For example, the password hash designation interface 510 may display one or more of: a button or buttons, toggle or toggles, check box or boxes, and/or other interface elements. For example, as illustrated in FIG. 5B, the interface elements may be buttons the user can select to decide whether or not to override a security action, and/or buttons the user can select to decide whether or not to override a password hash designation. In some instances, based on user input directing the enterprise user device 106 to override the password hash designation, the enterprise user device 106 may send one or more commands directing the network traffic monitoring platform 102 to override the password hash designation. For example, the enterprise user device 106 may send the one or more commands directing the network traffic monitoring platform 102 to override the password hash designation via the communication interface 113 and while the second wireless data connection is established. In some examples, based on the one or more commands directing the network traffic monitoring platform 102 to override the password hash designation, the network traffic monitoring platform 102 may override the password hash designation. For example, the network traffic monitoring platform 102 may override a secure hash designation by changing the secure hash designation to an attacked hash designation (which may, e.g., cause the network traffic monitoring platform 102 to perform password complexity generation operations on the password hash).

In some examples, based on user input directing the enterprise user device 106 not to override the password hash designation (i.e., by confirming the password hash designation), the enterprise user device 106 may send one or more commands directing the network traffic monitoring platform 102 to confirm the password hash designation. For example, the enterprise user device 106 may send the one or more commands directing the network traffic monitoring platform 102 to confirm the password hash designation via the communication interface 113 and while the second wireless data connection is established. In some examples, based on the one or more commands directing the network traffic monitoring platform 102 to confirm the password hash designation, the network traffic monitoring platform 102 may confirm the password hash designation. For example, the network traffic monitoring platform 102 may confirm an attacked hash designation by retaining the attacked hash designation (which may, e.g., cause the network traffic monitoring platform 102 to perform password complexity generation operations on the password hash).

Referring back to FIG. 2D, at step 216, network traffic monitoring platform 102 may establish a connection with user device 108. For example, network traffic monitoring platform 102 may establish a third wireless data connection with user device 108 to link the user device 108 with the network traffic monitoring platform 102 (e.g., in preparation for receiving proposed passwords, and/or other functions). In some instances, the network traffic monitoring platform 102 may identify whether or not a connection is already established with the user device 108. If a connection is already established with the user device 108, the network traffic monitoring platform 102 might not re-establish the connection. If a connection is not yet established with the user device 108, the network traffic monitoring platform 102 may establish the third wireless data connection as described above.

At step 217, the user device 108 may, based on user input, send a proposed password to network traffic monitoring platform 102. For example, the user device 108 may send the proposed password via the communication interface 113 and while the third wireless data connection is established. In some instances, the proposed password may be sent by user device 108 based on a request from the network traffic monitoring platform 102. For example, the network traffic monitoring platform 102 may send one or more commands directing user device 108 to display a user interface and/or otherwise cause user device 108 to display a user interface. For example, network traffic monitoring platform 102 may cause the user device 108 to display a user password interface. The user password interface may be configured to receive user input through the user device 108.

Figure 5C:
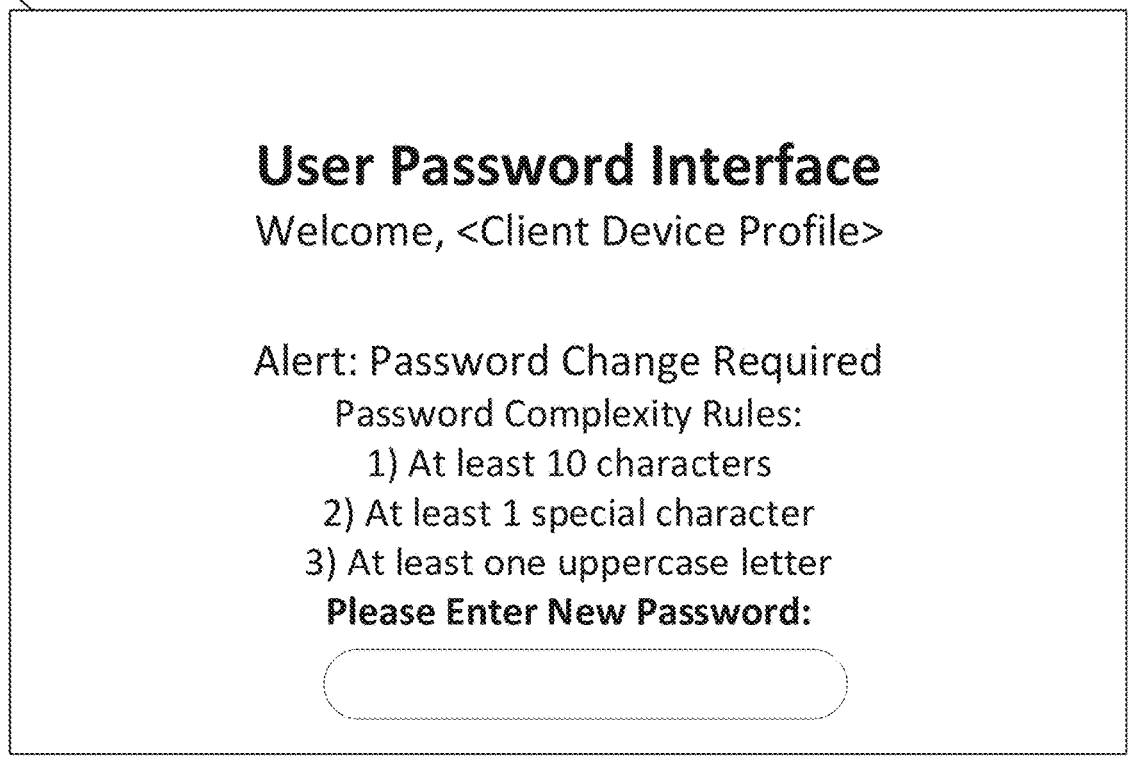

For example, in displaying a user password interface, the user device 108 may display a graphical user interface similar to user password interface 520, which is illustrated in FIG. 5C. Referring to FIG. 5C, in some instances, the user password interface 520 may include information corresponding to generating a proposed password. For example, the user password interface 520 may include information such as an alert notifying a user (e.g., the user of user device 108) that a password change is required, one or more password complexity rules (which may, e.g., be password complexity rules generated by the network traffic monitoring platform 102 and/or stored in the attack pattern storage system 104), and/or other information. The user password interface 520 may also display interface elements or selectable options requesting user input. For example, the failed user password interface 520 may display one or more of: an information entry field, a button or buttons, toggle or toggles, check box or boxes, and/or other interface elements. For example, as illustrated in FIG. 5C, the interface elements may be an information entry field the user can enter a new password into (e.g., using a keyboard and/or other information entry device).

Referring back to FIG. 2D, at step 218, the network traffic monitoring platform 102 may receive the proposed password from user device 108. For example, the network traffic monitoring platform 102 may receive the proposed password via the communication interface 113 and while the third wireless data connection is established.

In some examples, the proposed password may correspond to a user profile that may, e.g., be associated with a secure account (e.g., a secure account managed by an enterprise organization, such as a financial institution and/or other institutions). The proposed password may be proposed as an authentication method for accessing the secure account.

At step 219, based on receiving the proposed password, the network traffic monitoring platform 102 may identify whether the proposed password passes or fails a compliance check. In identifying whether the proposed password passes or fails a compliance check the network traffic monitoring platform 102 may compare the proposed password to the password enforcement policy (e.g., a password enforcement policy created by an individual and/or an organization, as described above at step 210). For example, the network traffic monitoring platform 102 may compare the proposed password to one or more requirements corresponding to password creation included in the password enforcement policy (e.g., restrictions on included terms, restrictions on certain alphanumeric sequences, numeral inclusion requirements, special character inclusion requirements, letter case requirements, recency restrictions, length requirements, and/or other restrictions). For example, in one instance, the proposed password may contain both letters and numbers, and the password enforcement policy may include a restriction on repeating any set of letters or numbers anywhere in a proposed password. In this example, based on comparing the proposed password and the restriction on using the term "Password," the network traffic monitoring platform 102 may identify that the proposed password does not comply with the restriction and therefore fails the compliance check. In some instances, in identifying whether the proposed password passes or fails the compliance check, the network traffic monitoring platform 102 may additionally compare a device signature associated with user device 108 against a device attack list (e.g., the device attack list described above at step 203). Based on the comparison, the network traffic monitoring platform 102 may identify whether or not the user device 108 is included in the device attack list. Based on identifying that the user device 108 is included in the device attack list, the network traffic monitoring platform 102 may identify that the proposed password fails the compliance check.

Based on identifying that the proposed password fails the compliance check, the network traffic monitoring platform 102 may proceed to step 221 and reject the proposed password. Based on identifying that the proposed password passes the compliance check, the network traffic monitoring platform may proceed to step 220 and configure the user profile.

Figure 2E:
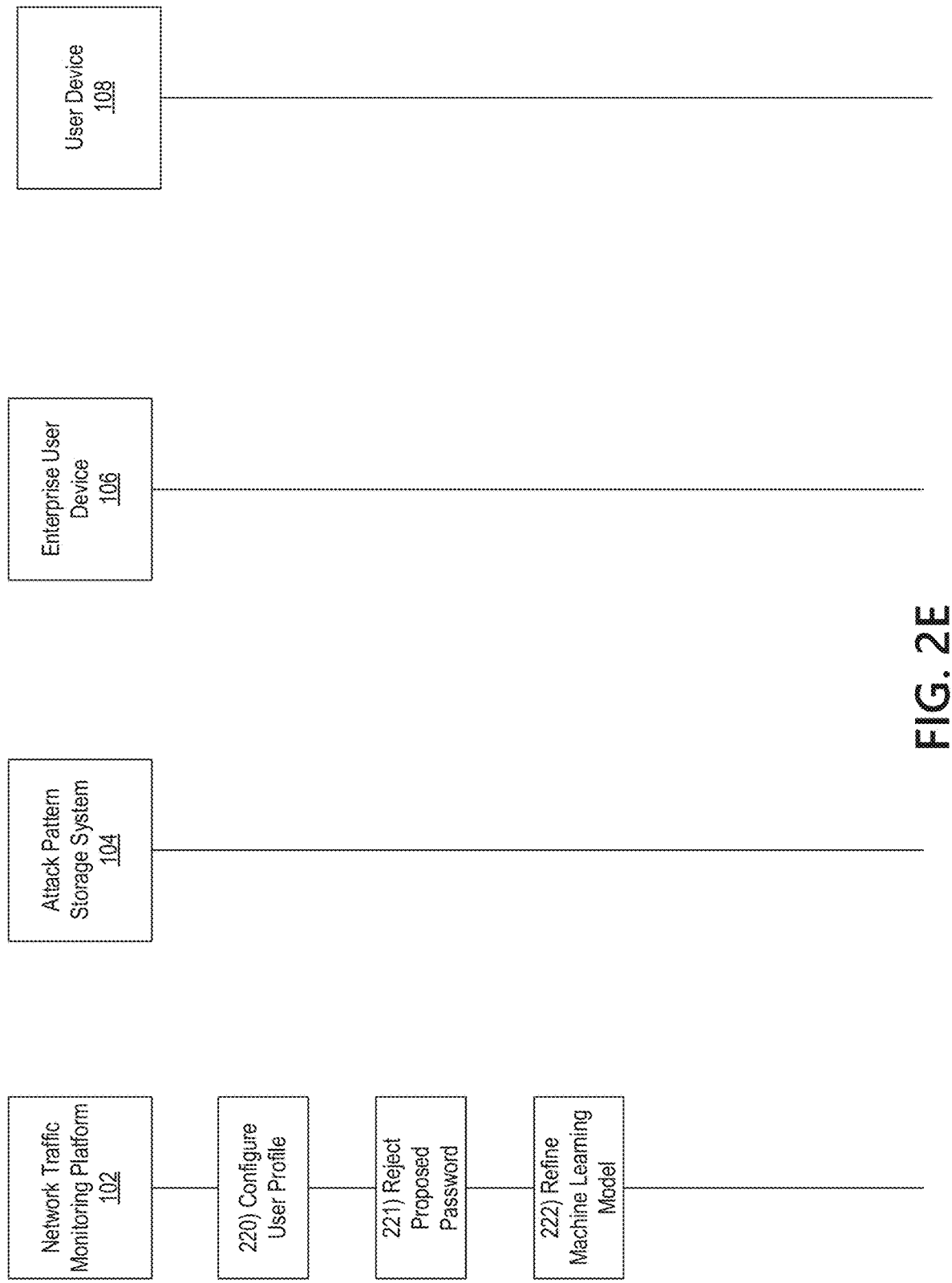

Referring to FIG. 2E, at step 220, based on identifying that the proposed password passes the compliance check, the network traffic monitoring platform 102 may configure the user profile. In configuring the user profile, the network traffic monitoring platform 102 may update a password associated with the user profile by replacing an existing password with the proposed password. In some instances, the user profile may comprise a user identifier and a password repository comprising one or more historical passwords. In these instances, the network traffic monitoring platform may add the proposed password to the password repository. In some examples, the network traffic monitoring platform 102 may use the password repository when comparing proposed passwords to the password enforcement policy, e.g. in future password complexity rule generation operations. For example, a password enforcement policy may include a restriction on any passwords used within 6 months (i.e., a recency restriction). In this example, if a new proposed password is equivalent to the proposed password used to configure the user profile, as described above, or is equivalent to any other password included in the password repository, the network traffic monitoring platform 102 may identify that the new proposed password does not comply with the recency restriction and therefore fails the compliance check. Based on configuring the user profile, the network traffic monitoring platform 102 may proceeds to step 222, without performing the actions described below at step 221.

At step 221, the network traffic monitoring platform 102 may reject the proposed password. In rejecting the proposed password, the network traffic monitoring platform 102 may determine not to configure the user profile to include the proposed password. In some instances, based on rejecting the proposed password, the network traffic monitoring platform 102 may send the password enforcement policy to the user device 108 (e.g., in order to assist the user in proposing passwords that comply with the password enforcement policy and the password complexity rules generated by network traffic monitoring platform 102). For example, the network traffic monitoring platform 102 may send the password enforcement policy via the communication interface 113 and while the third wireless data connection is established.

At step 222, the network traffic monitoring platform 102 may refine, validate and/or otherwise update the attack pattern analysis model based on the attacked hash and the cumulative attack score. In some instances, refining the attack pattern analysis model may include inputting the attacked hash and the cumulative attack score into the attack pattern analysis model. By inputting the attacked hash and the cumulative attack score into the attack pattern analysis model, the network traffic monitor platform 102 may create an iterative feedback loop that may continuously and dynamically refine the attack pattern analysis model to improve its accuracy. For example, network traffic monitoring platform 102 may identify that a particular parameter included in the behavior profile (e.g., data duplication, speed of interaction, typing pattern, error rate, vicinity of request source, mouse dynamics, event sequence analysis, request data patterns, browser configuration, operating system configuration, device battery level, request payload pattern, request timestamp duplication, request timestamp pattern, trust of a source internet protocol, and/or other parameters included in the behavior profile) contributed to the cumulative attack score by a particular amount (e.g., the network traffic monitoring platform 102 assigned a particular weight to the value of the particular parameter). In these instances, the network traffic monitoring platform 102 may refine attack pattern analysis model to automatically cause the particular parameter to contribute to the cumulative attack score by the same amount (e.g., by assigning the same weight to the value of the particular parameter) when the particular parameter is included in the behavior profile in future iterations of the feedback loop. In doing so, the network traffic monitoring platform 102 may improve the accuracy and effectiveness of the password complexity rule generation process by the machine learning model, which may, e.g., result in more efficient training of models trained by the network traffic monitoring platform 102 (and may in some instances, conserve computing and/or processing power/resources in doing so).

Figure 6:
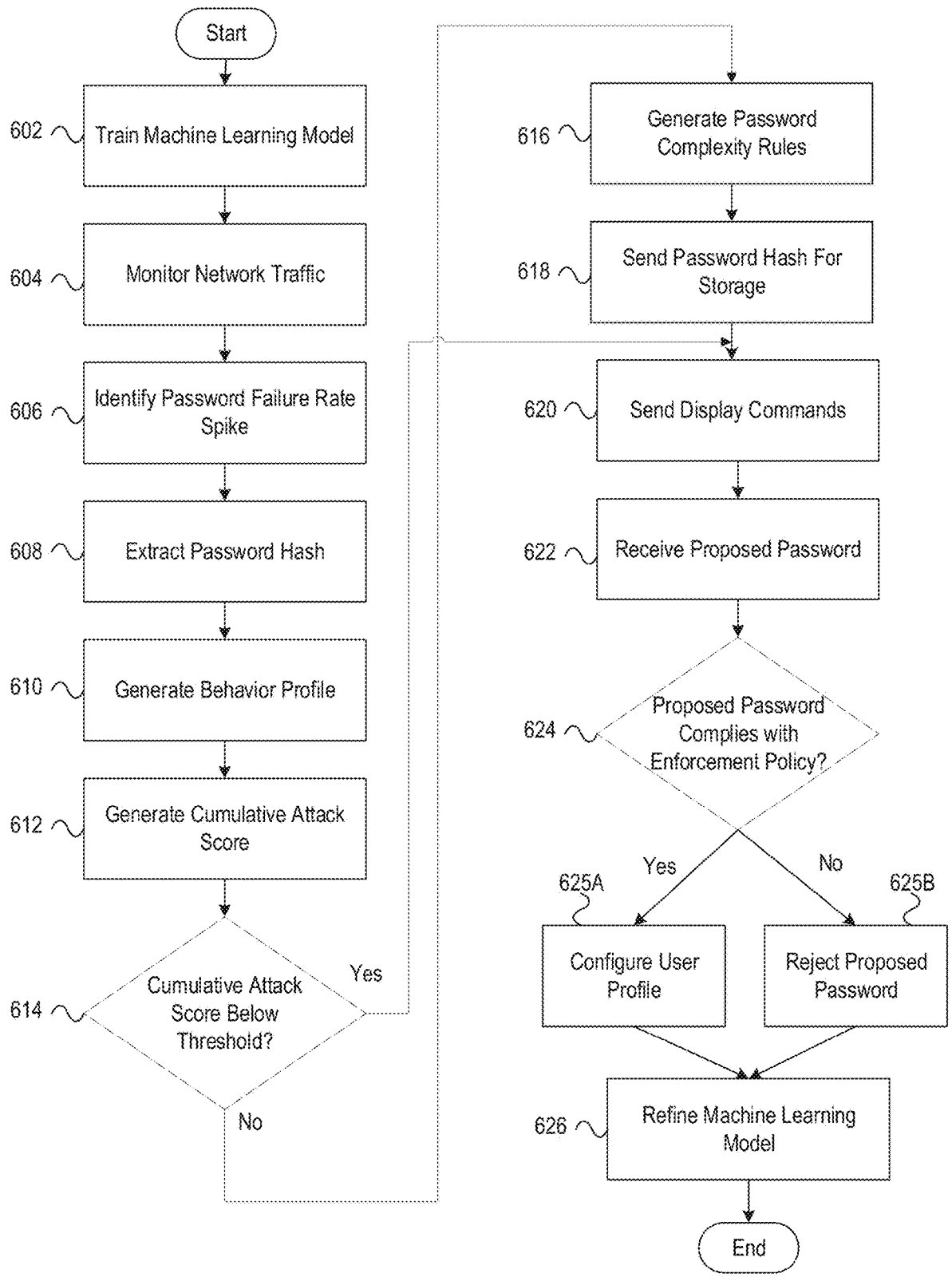
FIG. 6 depicts an illustrative method for generating password complexity rules based on attack pattern analysis using hash segmentation in accordance with one or more example arrangements.

FIG. 6 depicts an illustrative method for generating password complexity rules based on attack pattern analysis using hash segmentation in accordance with one or more example arrangements. Referring to FIG. 6, at step 602, a computing platform having at least one processor, a communication interface, and memory may train a machine learning model. For example, the computing platform may train an attack pattern analysis model. At step 604, the computing platform may monitor network traffic. At step 606, the computing platform may identify a password failure rate spike. At step 608, the computing platform may extract a password hash from the network traffic. At step 610, the computing platform may generate a behavior profile. At step 612, the computing platform may generate a cumulative attack score based on the behavior profile. At step 614, the computing platform may identify whether the cumulative attack score is below a threshold value. Based on identifying that the cumulative attack score is below a threshold value, the computing platform may progress to step 620. Based on identifying that the cumulative attack score meets or exceeds the threshold value (i.e., is not below the threshold value), the computing platform may progress to step 616.

At step 616, the computing platform may generate password complexity rules. At step 618, the computing platform may send the password hash to an attack pattern storage system for storage. At step 620, the computing platform may send display commands. For example, the computing platform may send commands to display a user interface to an enterprise user device. At step 622, the computing platform may receive a proposed password. For example, the computing platform may receive the proposed password from a user device. At step 624, the computing platform may identify whether or not the proposed password complies with a password enforcement policy including the generated password complexity rules. Based on identifying that the proposed password complies with the password enforcement policy, the computing platform may progress to step 625A. Based on identifying that the proposed password does not comply with the password enforcement policy, the computing platform may progress to step 625B. At step 625A, the computing platform may configure a user profile based on the proposed password. At step 625B, the computing platform may reject the proposed password. At step 626, the computing platform may refine the machine learning model. For example, the computing platform may refine the attack pattern analysis model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
train, based on historical password hashes, an attack pattern analysis model, wherein training the attack pattern analysis model configures the attack pattern analysis model to output, for a password hash, a behavior profile corresponding to a plurality of parameters and a cumulative attack score;
monitor network traffic of a network, wherein monitoring the network traffic of the network comprises monitoring a password failure rate;
identify, based on the monitoring of the password failure rate, a password failure rate spike;
extract, from the network traffic of the network, a first password hash associated with the password failure rate spike;
generate, based on inputting the first password hash into the attack pattern analysis model, a first behavior profile corresponding to a first plurality of parameters for the first password hash;
generate, using the attack pattern analysis model, a first cumulative attack score corresponding to the first password hash based on the first behavior profile corresponding to the first plurality of parameters;
compare the first cumulative attack score to a threshold value;
based on identifying that the first cumulative attack score is below the threshold value:
identify the first password hash as a secure hash, and
send a notification to an enterprise user device;
based on identifying that the first cumulative attack score meets or exceeds the threshold value:
identify the first password hash as an attacked hash,
generate password complexity rules based on the attacked hash, wherein generating the password complexity rules updates a password enforcement policy preventing use of the attacked hash as a future password, and
cause, based on generating the password complexity rules, storage of the password complexity rules at an attack pattern storage system; and
refine the attack pattern analysis model based on the attacked hash and the cumulative attack score.

2. The computing platform of claim 1, wherein generating the password complexity rules comprises:
retrieving, from the attack pattern storage system, a plurality of additional attacked hashes;
identifying, based on the attacked hash and the plurality of additional attacked hashes, one or more requirements corresponding to password creation; and
updating, based on the one or more requirements corresponding to password creation, the password enforcement policy, wherein updating the password enforcement policy is further based on the one or more requirements corresponding to password creation.

3. The computing platform of claim 2, wherein the one or more requirements corresponding to password creation comprise one or more of:
restrictions on included terms, restrictions on certain alphanumeric sequences, numeral inclusion requirements, special character inclusion requirements, letter case requirements, recency restrictions, or length requirements.

4. The computing platform of claim 2, wherein the memory stores additional computer-readable instructions that, when executed by the at least one processor, cause the computing platform to:
perform, based on the attacked hash and the plurality of additional attacked hashes, behavioral analysis operations.

5. The computing platform of claim 1, wherein the memory stores additional computer-readable instructions that, when executed by the at least one processor, cause the computing platform to:
receive, from the attack pattern storage system, the historical password hashes; and
based on identifying the attacked hash, send, to the attack pattern storage system, one or more commands directing the attack pattern storage system to store the attacked hash.

6. The computing platform of claim 5, wherein performing behavioral analysis operations comprises:
building, using the attacked hash and a plurality of additional attacked hashes, a network graph comprising a plurality of nodes and a plurality of edges, wherein each of the plurality of nodes corresponds to a parameter and each of the plurality of edges corresponds to a hash;
shading, based on a concentration of the plurality of edges and the plurality of nodes, the network graph; and
updating, based on the shading and the attacked hash, the first cumulative attack score.

7. The computing platform of claim 2, wherein the memory stores additional computer-readable instructions that, when executed by the at least one processor, cause the computing platform to:
receive, from a user device, a proposed password;
compare the proposed password to the updated password enforcement policy;
identify, based on the comparing, whether the proposed password passes or fails a compliance check based on the updated password enforcement policy;
based on identifying that the proposed password passes the compliance check, updating a user profile corresponding to the user device; and
based on identifying that the proposed password fails the compliance check, rejecting the proposed password and sending the updated password enforcement policy to the user device.

8. The computing platform of claim 7, wherein the user profile corresponding to the user device comprises:
a user identifier; and
a password repository corresponding to one or more historical passwords.

9. The computing platform of claim 1, wherein the memory stores additional computer-readable instructions that, when executed by the at least one processor, cause the computing platform to:
send, to the enterprise user device, one or more display commands directing the enterprise user device to display a user interface and requesting user input corresponding to a password hash designation;
receive, based on requesting the user input corresponding to the password hash designation, the user input corresponding to the password hash designation from the enterprise user device;
based on user input directing the computing platform to override the password hash designation, override the password hash designation; and
based on user input directing the computing platform to confirm the password hash designation, confirm the password hash designation.

10. The computing platform of claim 9, wherein the password hash designation comprises a secure hash designation or an attacked hash designation.

11. The computing platform of claim 1, wherein extracting the password hash comprises:
identifying, based on the network traffic, a frequency score corresponding to the first password hash associated with the password failure rate spike, wherein the frequency score indicates a number of authentication attempts corresponding to the first password hash;
comparing the frequency score to a failure rate threshold; and
based on identifying that the frequency score meets or exceeds the failure rate threshold, storing the first password hash to the computing platform.

12. The computing platform of claim 11, wherein the frequency score comprises one or more of: an integer value, a binary value, a decimal value, a fractional value, or a percentile value.

13. The computing platform of claim 1, wherein the first behavior profile comprises:
a list of the first plurality of parameters; and
values corresponding to the first plurality of parameters, wherein the values corresponding to the first plurality of parameters comprise one or more of:
numerical values, percentile values, or binary values.

14. The computing platform of claim 13, wherein the first plurality of parameters comprises one or more of:
data duplication, speed of interaction, typing pattern, error rate, vicinity of request source, mouse dynamics, event sequence analysis, request data patterns, browser configuration, operating system configuration, device battery level, request payload pattern, request timestamp duplication, request timestamp pattern, or trust of a source internet protocol.

15. The computing platform of claim 1, wherein the password failure rate comprises an indicator of a number of failed authentication attempts corresponding to the first password hash and requested by a user.

16. The computing platform of claim 1, wherein the memory stores additional computer-readable instructions that, when executed by the at least one processor, cause the computing platform to:
identify, based on the network traffic, a device signature associated with the password failure rate spike; and
configure, based on the device signature, a device attack list, wherein the device attack list causes the computing platform to:
based on the device attack list, reject password change requests corresponding to user devices included in the device attack list.

17. The computing platform of claim 1, wherein the threshold value is a configurable value configured by an enterprise user.

18. The computing platform of claim 1, wherein the first cumulative attack score comprises one or more of: an integer value, a percentage value, a decimal value, a hexadecimal value, or a binary value.

19. A method comprising:
at a computing platform comprising at least one processor, a communication interface, and memory:
training, based on historical password hashes, an attack pattern analysis model, wherein training the attack pattern analysis model configures the attack pattern analysis model to output, for a password hash, a behavior profile corresponding to a plurality of parameters and a cumulative attack score;
monitoring network traffic of a network, wherein monitoring the network traffic of the network comprises monitoring a password failure rate;
identifying, based on the monitoring of the password failure rate, a password failure rate spike;

extracting, from the network traffic of the network, a first password hash associated with the password failure rate spike;
generating, based on inputting the first password hash into the attack pattern analysis model, a first behavior profile corresponding to a first plurality of parameters for the first password hash;
generating, using the attack pattern analysis model, a first cumulative attack score corresponding to the first password hash based on the first behavior profile corresponding to the first plurality of parameters;
comparing the first cumulative attack score to a threshold value;
based on identifying that the first cumulative attack score is below the threshold value:
   identifying the first password hash as a secure hash, and
   sending a notification to an enterprise user device;
based on identifying that the first cumulative attack score meets or exceeds the threshold value:
   identifying the first password hash as an attacked hash,
   generating password complexity rules based on the attacked hash, wherein generating the password complexity rules updates a password enforcement policy preventing use of the attacked hash as a future password, and
   causing, based on generating the password complexity rules, storage of the password complexity rules at an attack pattern storage system; and
refining the attack pattern analysis model based on the attacked hash and the cumulative attack score.

20. One or more non-transitory computer-readable media storing instructions that, when executed by a computing platform comprising at least one processor, a communication interface, and memory, cause the computing platform to:
   train, based on historical password hashes, an attack pattern analysis model, wherein training the attack pattern analysis model configures the attack pattern analysis model to output, for a password hash, a behavior profile corresponding to a plurality of parameters and a cumulative attack score;
   monitor network traffic of a network, wherein monitoring the network traffic of the network comprises monitoring a password failure rate;
   identify, based on the monitoring of the password failure rate, a password failure rate spike;
   extract, from the network traffic of the network, a first password hash associated with the password failure rate spike;
   generate, based on inputting the first password hash into the attack pattern analysis model, a first behavior profile corresponding to a first plurality of parameters for the first password hash;
   generate, using the attack pattern analysis model, a first cumulative attack score corresponding to the first password hash based on the first behavior profile corresponding to the first plurality of parameters;
   compare the first cumulative attack score to a threshold value;
   based on identifying that the first cumulative attack score is below the threshold value:
      identify the first password hash as a secure hash, and send a notification to an enterprise user device;
   based on identifying that the first cumulative attack score meets or exceeds the threshold value:
      identify the first password hash as an attacked hash,
      generate password complexity rules based on the attacked hash, wherein generating the password complexity rules updates a password enforcement policy preventing use of the attacked hash as a future password, and
      cause, based on generating the password complexity rules, storage of the password complexity rules at an attack pattern storage system; and
refine the attack pattern analysis model based on the attacked hash and the cumulative attack score.

\* \* \* \* \*